United States Patent
Demiralp et al.

(10) Patent No.: US 12,423,626 B2
(45) Date of Patent: Sep. 23, 2025

(54) DYNAMIC INVITATION TRANSMISSION AND PRESENTATION MODE DETERMINATION FOR A NETWORK-BASED SERVICE

(71) Applicant: Uber Technologies, Inc., San Francisco, CA (US)

(72) Inventors: Emre Demiralp, San Francisco, CA (US); Meisam Vosoughpour, San Francisco, CA (US); Stephen LePallone, San Francisco, CA (US); Hamid Nazerzadeh, San Francisco, CA (US); Mustafa Sahin, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 833 days.

(21) Appl. No.: 17/694,292

(22) Filed: Mar. 14, 2022

(65) Prior Publication Data

US 2022/0292414 A1 Sep. 15, 2022

Related U.S. Application Data

(60) Provisional application No. 63/161,294, filed on Mar. 15, 2021.

(51) Int. Cl.
G06Q 10/04 (2023.01)
G01C 21/34 (2006.01)
(Continued)

(52) U.S. Cl.
CPC ....... *G06Q 10/047* (2013.01); *G01C 21/3438* (2013.01); *H04W 4/023* (2013.01);
(Continued)

(58) Field of Classification Search
CPC ..... H04L 67/51; H04L 67/1004; H04L 67/01; H04L 67/54; H04L 41/16; H04L 41/147;
(Continued)

(56) References Cited

U.S. PATENT DOCUMENTS 7,751,315 B1 7/2010 Pai
10,171,569 B2 * 1/2019 Brinig .................... G06Q 50/40
(Continued)

FOREIGN PATENT DOCUMENTS

WO WO-2018058121 A1 * 3/2018 ......... G01C 21/3664

OTHER PUBLICATIONS

Operational benefits and challenges of shared-ride automated mobility-on-demand services; Author links open overlay panel Michael Hyland et al., Transportation Research Part A: Policy and Practice; vol. 134, Apr. 2020, pp. 251-270. (Year: 2020).*
(Continued)

*Primary Examiner* — Cuong H Nguyen
(74) *Attorney, Agent, or Firm* — Mahamedi IP Law LLP

(57) ABSTRACT

A network system can receive a first request for a transport service and a second request for the transport service. The system can identify, from a plurality of service providers, a first set of service providers for the first request, and a second set of service providers for the second request. Based on a first set of predictive parameters for the first set of service providers, the system implements a multi-invite mode by transmitting a first invitation data set to service the first request to a plurality of provider devices of the first set of service providers. Based on a second set of predictive parameters for the second set of service providers, the system implements an exclusive-invite mode by transmitting a second invitation data set to a provider device of a selected service provider of the second set of service providers.

20 Claims, 11 Drawing Sheets

(51) Int. Cl.
*G06Q 10/047* (2023.01)
*H04W 4/02* (2018.01)
*H04W 4/029* (2018.01)
*G06Q 50/40* (2024.01)

(52) U.S. Cl.
CPC ............ *H04W 4/029* (2018.02); *G06Q 50/40* (2024.01); *H04W 4/02* (2013.01)

(58) Field of Classification Search
CPC ...... H04W 4/023; H04W 4/029; G01C 21/36; G01C 21/3438; G06V 10/82
USPC .......................................................... 709/224
See application file for complete search history.

(56) References Cited

U.S. PATENT DOCUMENTS

| | | | |
|---|---|---|---|
| 10,248,913 B1 | 4/2019 | Gururajan | |
| 10,371,539 B2* | 8/2019 | Broyles | G01C 21/3438 |
| 11,601,511 B2* | 3/2023 | Yamashita | G06Q 50/40 |
| 11,674,811 B2* | 6/2023 | Shoval | G01C 21/3423 701/533 |
| 2006/0136326 A1 | 6/2006 | Heckman | |
| 2009/0147698 A1 | 6/2009 | Potvin | |
| 2009/0216600 A1 | 8/2009 | Hill | |
| 2011/0099040 A1 | 4/2011 | Felt | |
| 2011/0313804 A1 | 12/2011 | Camp | |
| 2012/0131170 A1 | 5/2012 | Spat | |
| 2013/0132140 A1 | 5/2013 | Amin | |
| 2013/0246207 A1 | 9/2013 | Novak | |
| 2013/0268406 A1 | 10/2013 | Radhakrishnan | |
| 2014/0011522 A1* | 1/2014 | Lin | H04W 4/02 455/456.2 |
| 2015/0058148 A1 | 2/2015 | Grosz | |
| 2015/0074215 A1 | 3/2015 | Arquette | |
| 2015/0161564 A1 | 6/2015 | Sweeney | |
| 2015/0339923 A1 | 11/2015 | Konig | |
| 2016/0092962 A1 | 3/2016 | Wasserman | |
| 2016/0275638 A1 | 9/2016 | Korpi | |
| 2016/0279523 A1 | 9/2016 | Altagar | |
| 2016/0307288 A1 | 10/2016 | Yehuda | |
| 2016/0335694 A1 | 11/2016 | Catino | |
| 2017/0046644 A1 | 2/2017 | Zhang | |
| 2017/0109805 A1 | 4/2017 | Eisen | |
| 2017/0132540 A1 | 5/2017 | Haparnas | |
| 2017/0140323 A1 | 5/2017 | Laird | |
| 2017/0161860 A1 | 6/2017 | Schultz | |
| 2017/0220966 A1 | 8/2017 | Wang | |
| 2017/0249847 A1 | 8/2017 | Marueli | |
| 2017/0284820 A1 | 10/2017 | Dryjanski | |
| 2017/0352093 A1 | 12/2017 | Armelin | |
| 2018/0088749 A1* | 3/2018 | Yamashita | G08G 1/202 |
| 2018/0159921 A1* | 6/2018 | Brinig | G06Q 50/40 |
| 2019/0266518 A1 | 8/2019 | Medina | |
| 2019/0289427 A1* | 9/2019 | Lin | H04W 4/029 |
| 2019/0295206 A1* | 9/2019 | Yamashita | G06F 3/0485 |
| 2019/0318630 A1 | 10/2019 | Marco | |
| 2020/0075016 A1* | 3/2020 | Goldstein | G06F 3/167 |
| 2020/0128101 A1* | 4/2020 | Meng | H04L 41/145 |
| 2020/0131932 A1 | 4/2020 | Sezer et al. | |
| 2021/0082076 A1* | 3/2021 | Gulati | H04W 4/021 |
| 2021/0209542 A1 | 7/2021 | Magazinik | |
| 2021/0276595 A1* | 9/2021 | Casas | G06V 30/19173 |
| 2022/0164910 A1 | 5/2022 | Gu | |
| 2022/0292414 A1 | 9/2022 | Demiralp | |
| 2023/0316155 A1* | 10/2023 | Wu | G06F 18/21 706/12 |

OTHER PUBLICATIONS

Bian, Zheyong, Xiang Liu, and Yun Bai. "Mechanism design for on-demand first-mile ridesharing." Transportation research part B: methodological 138: 77-117,. (Year: 2020).*

Boysen, Nils, Dirk Briskorn, and Stefan Schwerdfeger. "Matching supply and demand in a sharing economy: Classification, computational complexity, and application." European Journal of Operational Research 278.2 578-595. (Year: 2019).*

Davis, Gerald F., and Aseem Sinha. "Varieties of Uberization: How technology and institutions change the organization (s) of late capitalism." Organization Theory 2.1 (2021): 2631787721995198. (Year: 2021).*

Posen, Hannah A. "Ridesharing in the sharing economy: Should regulators impose Uber regulations on Uber." Iowa L. Rev. 101 (2015): 405. (Year: 2015).*

Mudrić, Mišo. "Nature of Uber services." Uber—Brave New Service or Unfair Competition: Legal Analysis of the Nature of Uber Services (2020): 15-55. (Year: 2020).*

* cited by examiner

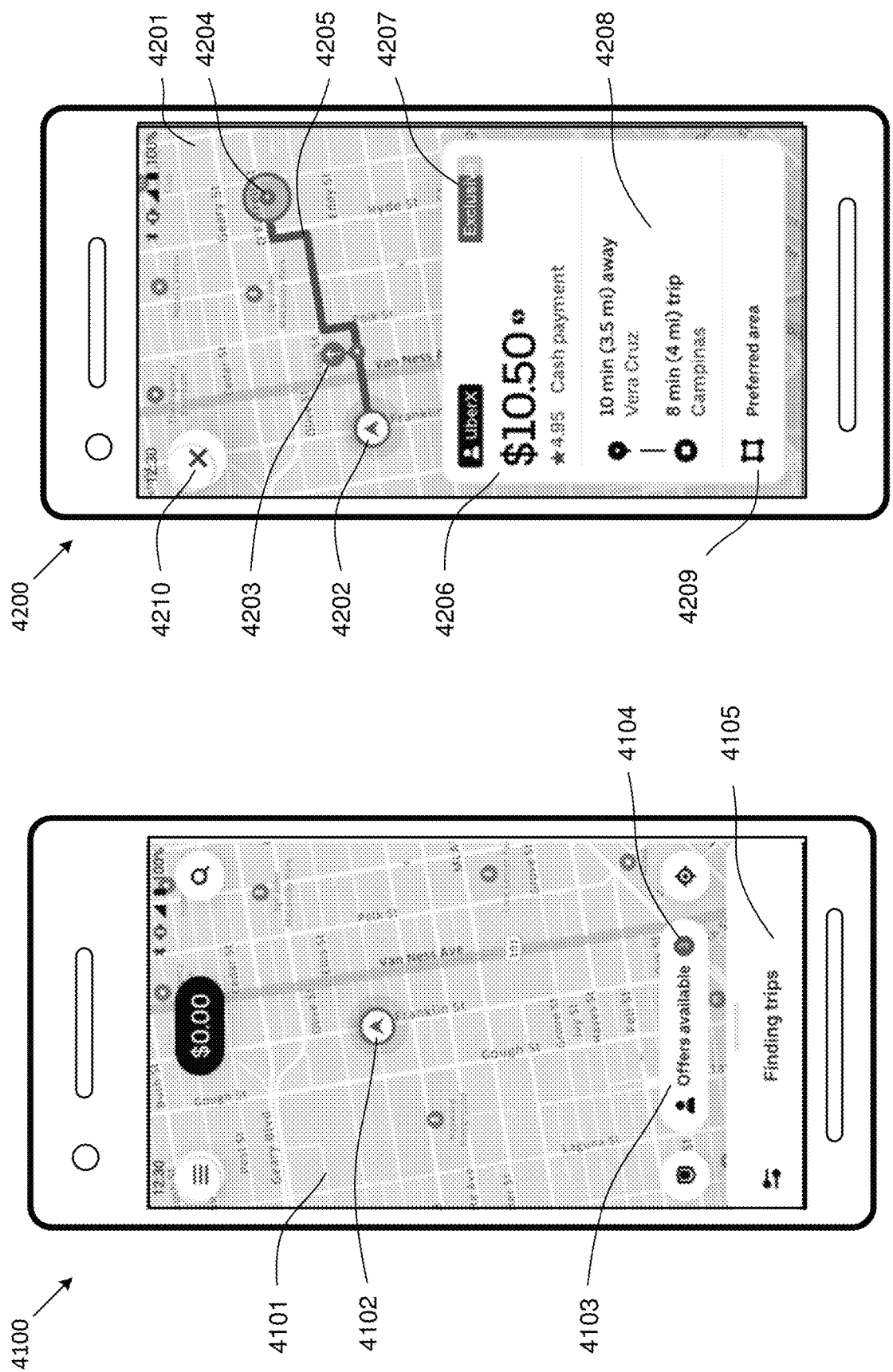

DYNAMIC INVITATION TRANSMISSION AND PRESENTATION MODE DETERMINATION FOR A NETWORK-BASED SERVICE

CROSS REFERENCE TO RELATED APPLICATION

This application claims the benefit of priority to U.S. Provisional Application No. 63/161,294, filed on Mar. 15, 2021; the aforementioned application being incorporated by reference in its entirety.

BACKGROUND

A network-based service can enable users to request and receive various services through applications on mobile computing devices. The network-based service can match a service provider with a requesting user based on the current location of the service provider and a start location specified by the requesting user or determined based on the current location of the requesting user.

BRIEF DESCRIPTION OF THE DRAWINGS

The disclosure herein is illustrated by way of example, and not by way of limitation, in the figures of the accompanying drawings in which like reference numerals refer to similar elements, and in which:

FIGS. 4A to 4D illustrate example graphical user interfaces presented by the service provider application, in accordance with examples described herein;

DETAILED DESCRIPTION

Figure 1:
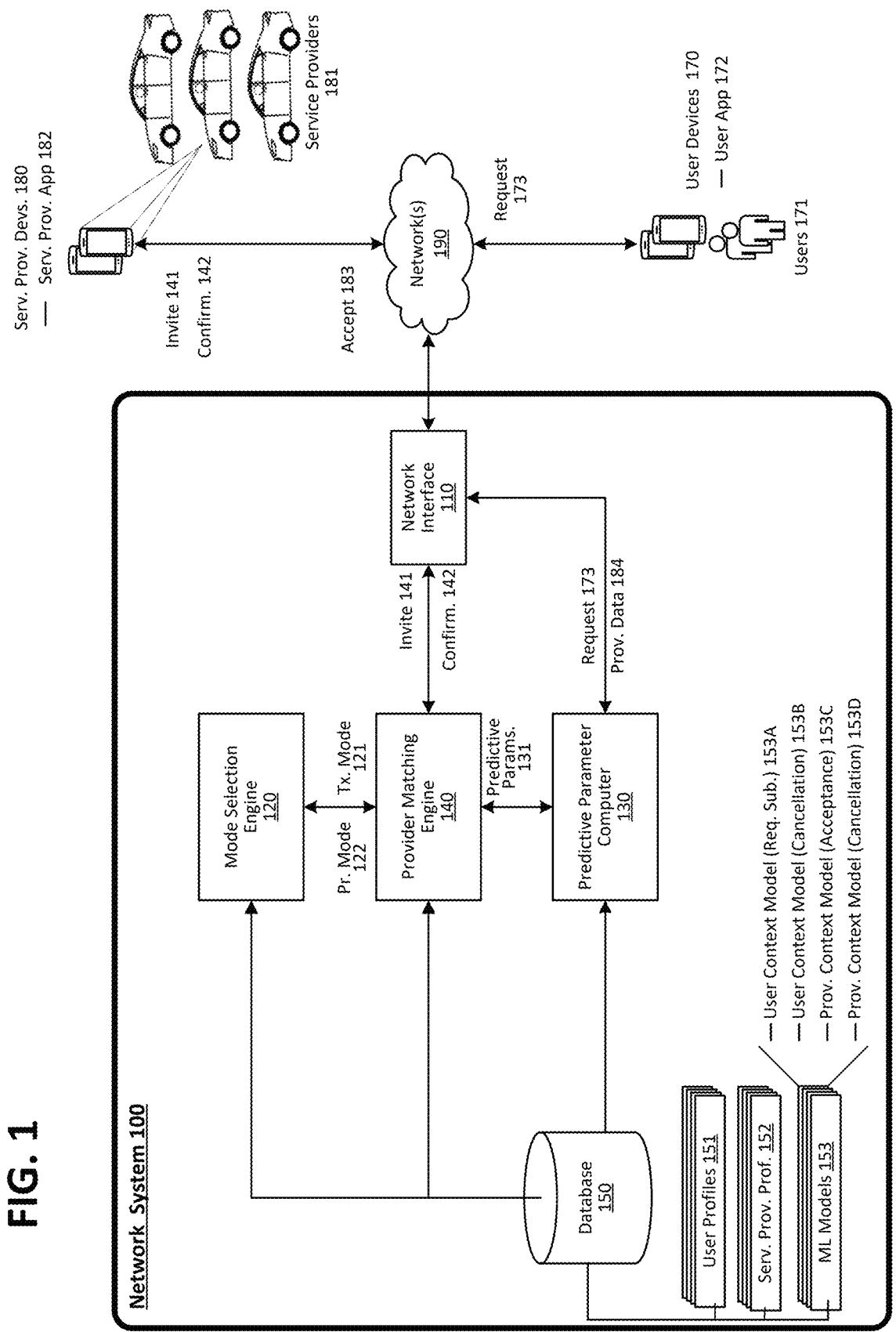
FIG. 1 is a block diagram illustrating an example network system managing a network-based service, in accordance with examples described herein.

A network system is provided herein that manages an on-demand network-based service linking available service providers with service requesters throughout a given region (e.g., a metroplex such as the San Francisco Bay Area). In doing so, the network system can receive service requests for on-demand services (e.g., transport service or delivery service) from requesting users (e.g., a rider) via a designated service requester application executing on the users' mobile computing devices. Based on a location associated with the requesting user (e.g., a current location, an indicated start or rendezvous location), the network system can identify a number of available service providers (e.g., a driver) and transmit a service invitation to one or more service provider devices of the available service providers to fulfil the service request. The provider devices of the service providers receiving the invitations can present content that allows the service providers to either accept or decline the invitation.

In identifying a service provider to fulfill a given service request, the network system can identify a service provider based, at least in part, on a start location indicated in the service request. For example, the network system can determine a geo-fence surrounding the start location (or a geo-fence defined by a radius away from the start location), identify a set of candidate service providers (e.g., twenty or thirty service providers within the geo-fence), and select an optimal service provider (e.g., a closest service provider to the service location, a service provider with the shortest estimated travel time from the service location, a service provider traveling to a location within a specified distance or specified travel time to the destination location, etc.) from the candidate service providers to fulfill the service request. According to examples provided herein, the network system can compile historical data for individual service requesters with regard to the network-based service. Thus, the network system can manage a service requester profile for each service requester indicating routine start and/or end locations (or regions), and/or routine routes (e.g., for a transportation service from home to work and/or vice versa), and preferred service types (e.g., transportation, delivery, mailing, etc.). In some examples, the network system can further synchronize with a service requester device to, for example, identify the service requester's contacts, the service requester's schedule and appointments, travel plans (e.g., a scheduled trip), and the like.

According to embodiments, the network system can compute predictive parameters for each of a plurality of service providers with respect to a request for service. The predictive parameters can be computed based on computed estimated times of arrival of the service provider to a start location of the request for service (e.g., location where a service provider is to rendezvous with the requesting user). In addition or as an alternative, the predictive parameters can be based on the output of one or more machine-learned models (e.g., user cancel model, provider acceptance model, provider cancel model, etc.) that can generate a predictive indicator of a user and/or service provider (e.g., likelihood of a user canceling the request for service, likelihood of a service provider accepting the request for service, likelihood of a service provider canceling the request for service after initially accepting the request, etc.). The matching parameter can be used by the network system to rank and identify service providers for purposes of identifying optimal service provider matches for fulfilling the request for service.

According to embodiments, the network system can fulfill a request for service in accordance with either an exclusive-invite mode (or one-to-one match mode, a single invite mode, etc.) or a multi-invite mode. When fulfilling a request in accordance with the exclusive-invite mode, the network system can identify a single service provider and transmit an invitation or offer relating to the request to the single service provider. As provided herein, the invitation or offer corresponds to a data set transmitted by the network system that causes the computing device of the service provider to present an interactive feature (e.g., on a service provider interface presented on the computing device) that enables the service provider to decline or accept the invitation or offer. When fulfilling the request in accordance with the multi-invite mode, the network system can identify a set of service providers and transmit a corresponding invitation to each of the set of service providers. If multiple service providers respond to or accept the invitation to fulfill the request, the network system can identify one of those service providers to fulfill the request. In addition, in the multi-invite mode, a service provider can view or select between multiple invitations or offers relating to multiple requests for service.

According to embodiments, the network system can dynamically determine whether to fulfill a request for service in accordance with the exclusive-invite mode or in accordance with the multi-invite mode. The network system can do so based on, for example, supply and demand conditions for the network service at the time the request is being fulfilled in the relevant geographic region. In some implementations, the network system can dynamically determine, for a given request, between the exclusive-invite mode and the multi-invite mode to optimize the output of one or more predictive models that generate predictive parameters relating to the experience of the requesting user and/or the service providers. For instance, the network system can determine the mode to minimize an estimated time of arrival of a service provider to the start location indicated in the request, or by attempting to maximize a computed probability that at least one service provider will accept an invitation relating to the request within a given timeframe, and/or to maximize a computed conversion probability (e.g., a probability that the request will be converted into a completed trip).

In some implementations, the network system can dynamically determine between the exclusive-invite mode and the multi-invite mode based on, for example, the predictive parameters of service providers that are available to be matched with the request. The network system can determine to operate in accordance with the exclusive-invite mode based on the matching parameter of a given service provider being above a threshold value. In response to determining that the given service provider's matching parameter is above the threshold value for triggering the exclusive-invite mode, the network system can transmit a single invitation relating to the request for service to the given service provider. This threshold value can be predetermined or can be dynamically determined based on the predictive parameters of available service providers with respect to the request for service (e.g., the given service provider's matching parameter satisfying a statistical measure in relation to the predictive parameters of other available service providers under consideration for being matched with the requesting user). In this manner, the network system can be configured to proceed in fulfilling the request in the exclusive-invite mode when there is a service provider (e.g., the given service provider) that is particularly well-suited to being matched with the request. As a result, the network system can prioritize the matching between the requesting user and the given service provider who is particularly-well suited to fulfilling the request for service, and as such, the requesting user can be exclusively matched with the given service provider. Under other conditions, the network system can determine to fulfill the request in the multi-invite mode.

Content corresponding to an exclusive invitation or offer (e.g., an invitation relating to a request that is being fulfilled in accordance with the exclusive-invite mode) can be presented by the provider device of a service provider in a manner that is distinguishable from a multi-invite invitation (e.g., an invitation relating to a request that is being fulfilled in accordance with the multi-invite mode). Moreover, for a multi-invite invitation, the network system can further determine a presentation mode in which content corresponding to the multi-invite invitation is to be presented by the provider device of the recipient service provider. The presentation mode can be determined on a per-service provider basis. In this manner, a set of invitations relating to the same request for service that is being transmitted to a set of service providers can be presented in accordance with respective presentation modes determined individually for each of the set of service providers.

One presentation mode of a multi-invite invitation can be referred to as an active multi-invite presentation mode and another presentation mode can be referred to as a passive multi-invite presentation mode. In response to receiving an invitation associated with the active multi-invite presentation mode, a provider device can be triggered to automatically present (e.g., without user interactions) content corresponding to the invitation within a service provider application. In contrast, in response to receiving an invitation associated with the passive multi-invite presentation mode, the provider device can update a user interface feature displaying a number of pending invitations waiting for the service provider's response without actively presenting content corresponding to the received invitation within the service provider application. In response to a user interaction (e.g., a tap) of the user interface feature displaying the number of pending invitations, the provider device can present content corresponding to a list of the pending invitations, including the received invitation. In various implementations, the presentation mode of a multi-invite invitation relating to a given request for a given service provider can be dynamically determined by the network system based on the computed matching parameter of the given service provider for the given request and/or predictive parameters of other available service providers.

According to embodiments, a graphical user interface (GUI) for presenting invitations can present invitations relating to different service types. For example, the GUI can simultaneously present one or more invitations for a transport service (e.g., for transporting a requesting user to a destination location) as well one or more invitations for a delivery service (e.g., for picking up and delivering a requested item). Furthermore, within each service type, the GUI can present invitations having different classes of service. For instance, the GUI can simultaneously present one or more invitations having a rideshare service class and one or more invitations having a luxury service class within the transport service type.

In the manner described herein, the network system can dynamically determine both a mode of transmitting invitations (e.g., exclusive mode or multi-invite mode) in fulfilling a request for service as well as determine a presentation mode for presenting multi-invite invitations (e.g., active multi-invite presentation mode or passive multi-invite presentation mode) on an individual basis for each service provider who is to receive a multi-invite invitation. In one aspect, by doing so, the network system can customize matching of service providers with requests and content presentation on provider devices to, for example, prioritize a given service provider that is particularly well-matched or well-suited to fulfilling a given request. By presenting content relating to the invitations in the manner described herein, the network system can further enable service providers to easily distinguish between requests that are particularly well-suited and other requests that are less so, such that informed action can be taken. This is particularly important since the content is presented on the mobile devices of service providers, which have limited screen sizes, and the service providers' attention must be focused on operating their vehicles.

As used herein, the terms "optimize," "optimization," "optimizing," and the like are not intended to be restricted or limited to processes that achieve the most optimal outcomes. Rather, these terms encompass technological processes (e.g., heuristics, stochastics modeling, machine learning, reinforced learning, Monte Carlo methods, Markov decision processes, etc.) that aim to achieve desirable results. Similarly, terms such as "minimize" and "maximize" are not intended to be restricted or limited to processes or results that achieve the absolute minimum or absolute maximum possible values of a metric, parameter, or variable.

As used herein, a computing device refers to devices corresponding to desktop computers, cellular devices or smartphones, personal digital assistants (PDAs), laptop computers, virtual reality (VR) or augmented reality (AR) headsets, tablet devices, television (IP Television), etc., that can provide network connectivity and processing resources for communicating with the system over a network. A computing device can also correspond to custom hardware, in-vehicle devices, or on-board computers, etc. The computing device can also operate a designated application configured to communicate with the network service.

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs, or machines.

Some examples described herein can generally require the use of computing devices, including processing and memory resources. For example, one or more examples described herein may be implemented, in whole or in part, on computing devices such as servers, desktop computers, cellular or smartphones, personal digital assistants (e.g., PDAs), laptop computers, VR or AR devices, printers, digital picture frames, network equipment (e.g., routers), and tablet computing devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples disclosed herein can be carried and/or executed. In particular, the numerous machines shown with examples described herein include processors and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices, or tablets), and magnetic memory. Computers, terminals, and network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

System Description

FIG. 1 is a block diagram illustrating an example network system 100 managing a network-based service, in accordance with examples described herein. The network system 100 can implement and manage a network service that connects requesting users 171 with service providers 181 that are available to service the users' requests for service 173. The network service can provide a platform that facilitates services to be requested and provided between requesting users 171 and available service providers 181 by way of a user application 172 executing on the user devices 170 and a service provider application 182 executing on the service provider devices 180. As used herein, a user device 170 and a service provider device 180 can correspond to computing devices with functionality to execute a designated application (e.g., a user application 172, a provider application 182, etc.) associated with the network service managed by the network system 100. According to embodiments, the user device 170 and the service provider device 180 can correspond to mobile computing devices, such as smartphones, tablet computers, VR or AR headsets, on-board computing systems of vehicles, smart watches, and the like. Service providers 181 are illustrated as operating motor vehicles in FIG. 1. However, it is understood that the service providers 181 can fulfill the requests 173, particularly requests for a delivery service, in various manners including using micro-mobility means (e.g., bicycles, mopeds, scooters, etc.) and/or without operating a vehicle.

The network system 100 can include a network interface 110 to communicate with user devices 170 and service provider devices 180 over one or more networks 190 via the designated applications (e.g., user application 172, service provider application 182, etc.) executing on the devices. According to examples, a requesting user 171 wishing to utilize the network service can launch the user application 172 and transmit a request for service 173 over network 190 to the network system 100. In certain implementations, the requesting user 171 can view multiple different service types managed by the network system 100, such as ride-pooling service type, a basic or economy service type, a luxury vehicle service type, a van or large vehicle service type, a professional service provider service (e.g., in which the service providers 181 are certified), a self-driving vehicle service, a rickshaw service, and the like. The network system 100 can utilize the service provider locations to provide the user devices 170 with ETA data of proximate service providers for each respective service. For example, the user application 172 can enable the user 171 to scroll through each service type. In response to a soft selection of a particular service type, the network system 100 can provide ETA data on a user interface of the user application 172 that indicates an ETA for the service type and/or the locations of all proximate available vehicles for that service type. As the user scrolls through each service type, the user interface can update to show visual representations of vehicles for that service type on a map centered around the user 171 or a start location set by the user 171. The user 171 can interact with the user interface of the user application 172 to select a particular service type, and transmit a request 173.

As users 171 interact with the user application 172, the user devices 170 can transmit context data to the network system 100 via the network 190. Context data received from the user devices 170 such as sensor data (e.g., geolocation data, barometer data, accelerometer data, e-compass data, gyroscope data, ambient light sensor data, wireless connectivity data, etc.), application status (e.g., a launched status, a foreground execution status, a background execution status, etc.), and user input data (e.g., user inputs to the user application 172). The user devices 170 can be configured to periodically transmit the context data to the network system 100. In addition or as an alternative, the user device 170 can be configured to transmit context data in real-time to the network system 100 in response to events detected on the user device 170 (e.g., in response to detecting a change in sensor data reading, in response to user input received via the user application, in response to detecting a change in the user application status, etc.).

In the examples described herein, the network system 100 includes a matching parameter computer 130 to compute predictive parameters 131 of service providers with respect to requests 173. A predictive parameter 131 of a given service provider 181 with respect to a given request 173 can be computed based on location data transmitted by the service provider device 180 of the given service provider 181. According to embodiments, the predictive parameters 131 can be computed based on estimated times of arrival of an optimal service provider 181 or each of a candidate set of service providers 181 to a start location of the request 173 (e.g., a rendezvous or pickup location with the requesting user 171). Additionally or alternatively, the predictive parameters 131 can be based on outputs of one or more machine-learned models 153 stored in a database 150 of the network system 100. In certain implementations, the predictive parameter computer 130 can execute one or more of the machine-learned models 153 to generate a predictive indicator of a user 171 and/or service provider 181.

The machine-learned models 153 can include predictive models that process the contextual data (e.g., location data, input data, sensor data, etc.) received from the service provider devices 180 and the user device 170 to predict, for example, probabilities corresponding to whether a user 171 is likely to submit a request for service 173 or cancel a request for service 173, and probabilities corresponding to whether a service provider 181 is likely to accept 183 an invitation 141 to service a request 173 or whether the service provider 181 is likely to cancel an accepted invitation 183. In various examples, the predictive parameter computer 130 can execute a user request submission context model 153A, a user cancellation context model 153B, a provider acceptance context model 153C, and a provider cancellation context model 153D simultaneously or at varying times during user and provider application sessions in which the user application 172 and provider application 182 are executing on user and provider devices 170, 180 respectively.

In certain implementations, the predictive parameter computer 130 can further execute the machine-learned models 153 using historical service utilization information specific to each service provider 181 and each requesting user 171. This information can correspond to the historical manner in which each individual service provider 181 and user 171 interacts with the network service, such as the manner and/or preferences in which users 171 submit requests 173 (e.g., preferred service types, service locations of submitted requests 173, request frequency, etc.), cancellation rate for users 171 and additional contextual information corresponding to each cancellation (e.g., increases in ETA, lengthy ETAs, randomness, etc.), service provider acceptance and cancellation rates and additional contextual information corresponding to each acceptance 183 and/or cancellation, and the like. These unique attributes of each user 171 and service provider 181 may be stored in a user profile 151 of the user 171 and a service provider profile 152 of the service provider 181 for predictive purposes by the predictive parameter computer 130.

According to one implementation, the network system 100 includes a provider matching engine 140 to identify service providers 181 for matching with requests 173 based on the predictive parameters 131 computed by the predictive parameter computer 130. The provider matching engine 140 can select optimal user-to-provider pairings from potential (or hypothetical) user-to-provider pairings based on a group optimization of the predictive parameters 131. In one implementation, the provider matching engine 140 can resolve a bipartite graph to select the optimal user-to-provider pairing. For instance, the predictive parameter computer 130 can compute predictive parameters 131 associated with each of the potential user-to-provider pairings of the set of users 171 and the set of service providers 171. The predictive parameter computer 130 can execute the machine-learned models 153 to set up a bipartite graph data structure G=(U, P, E), where U represents vertices of the bipartite graph that correspond to the set of users 171, P represents vertices of the bipartite graph that correspond to the set of service providers 181, and E represents the edges between vertices U and P that correspond to the potential user-to-provider pairings. For each edge, the corresponding value associated therewith can be based on the predictive parameters 131 computed for the corresponding potential user-to-provider pairing.

For instance, a first edge E1 between a first user U1 and a first provider P1 can represent the potential user-to-provide pairing between U1 and P1. The value associated with E1 can be based on the predictive parameters 131 computed for the potential user-to-provider pairing between U1 and P1. For instance, the value associated with E1 can be a weighted sum of the predictive parameters 131 (e.g., location-based parameters, context-based parameters, etc.) computed for U1 and P1. The provider matching engine 140 can resolve the bipartite graph by selecting edges from the set of edges E that optimize an aggregate measure (e.g., sum, mean, average) of values of the selected edges. According to examples, the provider matching engine 140 can select edges such that each of the vertices of U has one edge selected (if possible), thereby ensuring that each of the set of users 171 has a corresponding matched service provider 181. The provider matching engine 140 can also do so such that the no vertex within P is coupled to more than one vertex within U (and vice versa), thereby ensuring that no service provider 181 is simultaneously matched with two users 171 (and vice versa). The set of selected edges, which is a subset of the edges E in the bipartite graph, can represent the selected user-to-provider pairings.

According to embodiments, the provider matching engine 140 can process a request 173 in accordance with either an exclusive-invite mode (e.g., a one-to-one match mode or a single invite mode) in which the predictive parameters 131 corresponding to user-provider pair indicate a high probability of acceptance 183 (e.g., above 99%) and a low probability of cancellation for both the user 171 and the service provider 181. When fulfilling a request 173 in accordance with the exclusive-invite mode, the provider matching engine 140 can utilize the predictive parameters 131 outputted by the predictive parameter computer 130 to identify a single service provider 181 that has a relatively high probability of accepting 183, and transmit an invitation 141 to the single service provider 181.

In further implementations, when fulfilling the request in accordance with the multi-invite mode, the provider matching engine 140 can identify a set of service providers 181 for a given request 173 and transmit a corresponding invitation 141 to each of the set of service providers 181. For example, when the probability of a single service provider 181 accepting an invitation 141 to service a particular request 173 is below a threshold (e.g., 70%)—as indicated by the predictive parameters 131—the provider matching engine 140 can determine to transmit invitations 141 to multiple service providers 181 in the multi-invite mode. If multiple service providers respond to or accept the invitation 141 to fulfill the request 173, the provider matching engine 140 can select an optimal one of those service providers 181 to fulfill the request 173 (e.g., based on a lowest ETA or other efficiency factors). On the provider side, in the multi-invite mode, a service provider 181 can view or select between multiple invitations 141 for multiple requests 173. In further implementations, the provider matching engine 140 can determine whether to treat a request 173 in accordance with the exclusive-invite mode or in accordance with the multi-invite mode based on factors affecting the network service in an area that includes the service location indicated in the request 173. For example, the provider matching engine 140 can do so based on provider supply and request demand conditions for the network service at the time the request 173 is received in the relevant geographic region corresponding to the request 173. In some implementations, the provider matching engine 140 can dynamically determine, for a given request 173, between the exclusive-invite mode and the multi-invite mode to optimize the output of the machine-learned predictive models 153 that generate the predictive matching parameters 131 for the requesting user 171 and/or candidate service providers 181. Additionally or alternatively, the provider matching engine 140 can determine which mode to implement for a given request 173 with objectives for minimizing an ETA of a service provider 181 to the start location indicated in the request 173, maximizing an outputted probability that at least one service provider 181 will accept an invitation 141 for the request 173 within a given timeframe, and/or maximizing a computed conversion probability (e.g., a probability that the request will be converted into a completed trip).

In some implementations, the network system can dynamically determine between the exclusive-invite mode and the multi-invite mode based on, for example, the predictive parameters 131 for candidate service providers 181 that are available to be matched with the request 173. The provider matching engine 140 can determine to operate in accordance with the exclusive-invite mode based on one or more predictive parameters 131 of a given service provider 181 being above a threshold value (e.g., a 90% probability of accepting an invitation 141 for the request 173). In response to determining that the one or more predictive parameters 131 are above the threshold value for triggering the exclusive-invite mode, the provider matching engine 140 can transmit a single invitation for the request 173 to the given service provider 181.

The threshold value can be predetermined or can be dynamically determined based on the current predictive parameters 131 of available service providers 181 with respect to the request 173 (e.g., the given service provider's predictive parameter 131 satisfying a statistical measure related to the predictive parameters 131 of all other available service providers 181 under consideration for being matched with the requesting user 171). In this manner, the provider matching engine 140 can be configured to proceed in fulfilling the request 173 in the exclusive-invite mode when there is a service provider 181 that has a high probability of accepting the request 173 (e.g., as outputted by the acceptance provider context model 153C), as well as a low probability of cancelling an acceptance 183 of the invitation 141 (e.g., as outputted by the cancellation provider context model 153D). As a result of these probabilities meeting or exceeding their respective thresholds for the exclusive-invite mode, the provider matching engine 140 can prioritize the match between the requesting user 171 and the given service provider 181 as opposed to implementing the multi-invite mode.

Conversely, when the predictive parameters 131 indicate a relatively low probability of acceptance 183 for an optimal service provider 181 (e.g., one with a lowest ETA to the start location indicated in the request 173), the provider matching engine 140 can implement the multi-invite mode for matching the request 173 to a service provider 181. As provided herein, the multi-invite mode enables the provider matching engine 140 to transmit an invitation 141 to service the request 173 to multiple service providers 181 simultaneously. When multiple acceptances 183 are received for the multi-invite invitation 141, the provider matching engine 140 can provide a match confirmation 142 to a most optimal service provider 181 selected from the multiple accepting service providers 181 (e.g., a service provider 181 having a lowest ETA).

In various embodiments, the network system 100 can include a mode selection engine 120, which can determine between a transmission mode 121 and a presentation mode 122 for invitations 141 transmitted to provider devices 180. The transmission mode 121 (or match mode) can correspond to the exclusive-invite mode in which a single service provider 181 is matched with and receives an invitation 141 for a request 173, or can correspond to a multi-invite mode in which multiple service providers 181 receive invitations 141 for a request 173. The determination of the transmission mode 121 can be made based on the predictive parameters 131 computed for the service providers 181 for the request 173. In this manner, if no service providers 181 are determined to be particularly suitable matches (e.g., based on the predictive parameters 131), the provider matching engine 140 can determine to operate in accordance with the multi-invite mode in fulfilling the request 173.

In some implementations, the mode selection engine 120 can further determine a presentation mode 122 in the event that the transmission mode 121 comprises the multi-invite mode. The mode selection engine 120 can determine, for each service provider 181 receiving the invitation 141, whether the respective service provider device 180 should present the invitation 141 in accordance with an active multi-invite presentation mode or in accordance with a passive multi-invite presentation mode. The presentation mode 122 can also be determined based at least in part on the predictive parameters 131. In this manner, some of the service providers 181 receiving invitations 141 for the request 173 (e.g., the service providers 181 deemed, based on the predictive parameters 131, as better matches for the request 173 among the service providers 181 receiving the invitations 141) can be presented with the invitations 141 in accordance with the active multi-invite presentation mode while other service providers 181 receiving invitations 141 for the request 173 can be presented with the invitations 141 in accordance with the passive multi-invite presentation mode.

A service provider 181 presented with an invitation 141 can accept or decline the invitation 141 via the service provider application 182. The provider device 180 can transmit an acceptance 183 in response to the service provider 181 accepting the invitation 141. The acceptance 183 can be received by the network system 100 and processed by the provider matching engine 140. In particular, for a request 173 being fulfilled in accordance with the multi-invite presentation mode, multiple service providers 181 can accept the invitations 141 for a request 173. The provider matching engine 140 can identify, among the service providers 181 who had accepted, one service provider 181 to fulfill the request 173. The provider matching engine 140 can do so based on the predictive parameters 131, which can be updated by the predictive parameter computer 130. In some implementations, the predictive parameter computer 130 can be configured to continuously or periodically update the predictive parameters 131 based on updated service provider locations, status, and context data. In response to selecting a service provider 181 among the service providers 181 who had accepted, the network system 100 can transmit a confirmation 142 to the selected service provider 181 to service the request 173.

Methodology

Figure 2A:
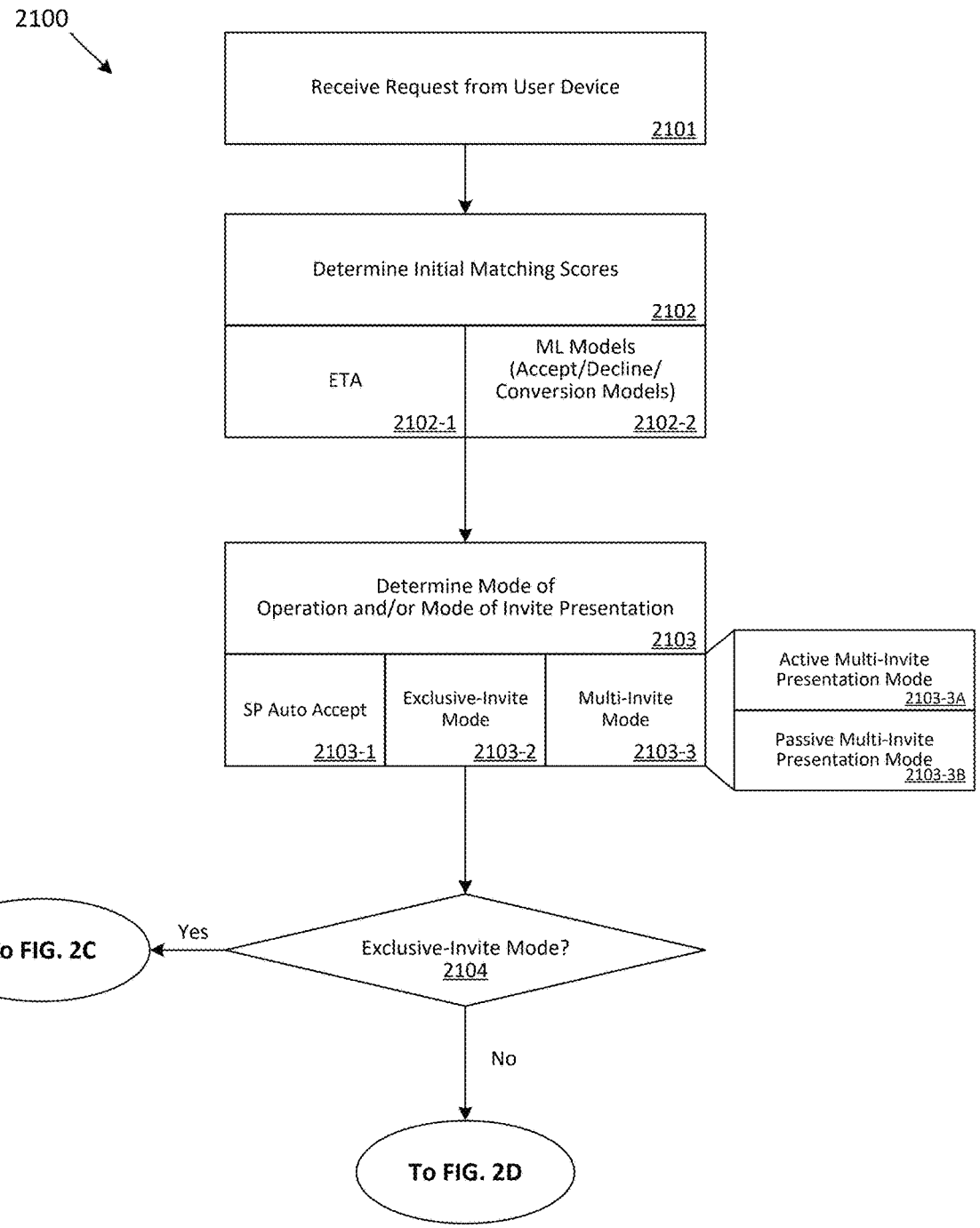
FIG. 2A is a flowchart diagram illustrating an example method of processing requests for service, in accordance with examples described herein.

FIG. 2A is a flowchart diagram illustrating an example method 2100 of processing requests for service, in accordance with examples described herein. In the below discussion of FIG. 2A, reference may be made to features and examples shown and described with respect to FIG. 1. For instance, the method 200 illustrated in and described with respect to FIG. 2A can be performed by the network system 100 illustrated in FIG. 1.

Referring to FIG. 2A, at step 2101, the network system 100 receives a request 173 for service (e.g., a request for a transport service, a request for a courier or delivery service, etc.) from a user device 170 over a network 190. The request 173 for service can include or indicate information such as a start location or a service location. In the context of a transport service, the start location can refer to a location at which a service provider 181 is to rendezvous and pickup the requesting user 171 and the service location can refer to a location at which the service provider 181 is to drop off the requesting user 171. The request 173 can be generated in response to the requesting user 171 interacting with the user application 172 executing on the user device 170.

In certain implementations, the network system 100 can process and identify service providers 181 for a plurality of requests 173 for service within a geographic region on a group basis (e.g., batch matching). Batch matching can be performed periodically (e.g., every fifteen seconds) on a rolling basis as requests 173 for service are received by the network system 100. In this manner, a batch matching process can be performed, for example, every fifteen seconds for the requests 173 for service that were received during a preceding fifteen second time period. For simplicity, method 2100 of FIG. 2A is illustrated as being performed for a request 173 received from a user device 170. However, it is contemplated that method 2100 can be performed as part of a batch matching process to identify, on a group basis, respective sets of service providers 181 for a plurality of requests 173 for service.

At step 2102, the network system 100 can compute predictive parameters 131 for a plurality of service providers 181 with respect to the request 173 for service that was received at step 2101. The plurality of service providers 181 can correspond to the service providers 181 that are available for matching (e.g., in an available state) within the geographic region in which the start location of the request 173 is located. A corresponding predictive parameter 131 can be computed by the network system 100 for each of the plurality of service providers 181. The predictive parameter 131 of a particular service provider 181 with respect to the request 173 can be a measure of how suitable the particular service provider 181 is in fulfilling the request 173 and can be used by the network system 100 in identifying service providers 181 for the request 173 as well as for determining the mode of operation and/or the mode of presenting the invitations 141 to the service providers 181 identified. Depending on the implementation, the predictive parameters 131 can be computed based on the ETAs (2102-1) of the service providers 181 to the start location or service location indicated by the request 173. In addition or as an alternative, the predictive parameters 131 can be computed using machine-learned models 153 (2102-2) that seek to optimize one or more aspects of the network service.

With respect to the ETAs (2102-1), the network system 100 can compute the ETAs based on live location data transmitted by the provider devices 180 of the service providers 181. In this manner, service providers 181 having the lowest ETAs to the start or service location of the request 173 can be prioritized in the matching process for the request 173. In certain implementations, for instance, the ETAs (or normalized measures of the ETAs) can be used as the predictive parameters 131. In other implementations, the ETAs can be combined with the outputs of the machine learned models 153 (2102-2) to arrive at the predictive parameters 131 and/or the ETAs can be used as inputs to one or more of the machine-learned models 153. Depending on the implementation, the weight given to the ETAs of the service providers 181 in computing the predictive parameters 131 can vary.

With respect to machine-learned models 153 (2102-2), the network system 100 can maintain a set of machine-learned models (MLMs) 153 that can be trained, based on historical data, to generate output that can be used in, for example, the matching process, as predictive indicators for various aspects of the network service. As examples, the MLMs 153 can be trained to generate one or more of: (i) a predictive acceptance metric (e.g., a likelihood or confidence metric that a given service provider 181 will accept or decline a given invitation 141), (ii) a predictive request cancel metric (e.g., likelihood or confidence metric that a requesting user 171 will cancel a pending request 173 due to, for example, wait time for a match or wait time for the matched service provider 181 to arrive at the start or service location), or (iii) a predictive conversion metric (e.g., a likelihood or confidence metric that a given request 173 will be converted to a completed trip for the requesting user 171). The inputs to the MLMs 153 can include information such as computed ETA of the service provider 181, data regarding the requesting user's interactions with the user application 172, sensor data generated by the user device 170, live data regarding alternative transport means (such as public transit status), the time and day of the request 173, and other context data that may be relevant or affect the determinations of these predictive metrics. By utilizing the MLMs 153, the network system 100 can prioritize, in the matching process for a given request 173, service providers 181 that are determined by the network system 100 as being likely to accept the invitation 141 for the request 173.

In certain implementations, the network system 100 can continuously or periodically (e.g., every twenty seconds) update the predictive parameters 131 of at least a subset of service providers 181 during the matching process (e.g., prior to a service provider 181 being associated with the request 173). In this manner, as service provider locations change and/or go online or offline, such changes can be reflected and the predictive parameters 131 can be updated.

At step 2103, the network system 100 can determine a mode of operation and/or a mode of invite presentation. The mode of operation can refer to the manner in which the request 173 is matched with service providers 181 in the network system's fulfillment of the request 173. In determining the mode of operation, the network system 100 can determine whether to (i) automatically associate one of the service providers 181 of the set of service providers 181 identified at step 2102 with the request 173 (service provider auto accept 2103-1), (ii) exclusively transmit a single invitation to one of the service providers 181 of the set of service providers 181 identified at step 2102 (exclusive or one-to-one invite mode 2103-2), or (iii) transmit multiple invitations to a subset of service providers 181 of the set of service providers 181 identified at step 2102 (multi-invite mode 2103-3).

In various implementations, the manner in which content relating to an invitation 141 is presented on the provider device 180 can depend on the mode of operation. For instance, an exclusive invitation (e.g., an invitation for a request 173 that is being fulfilled in accordance with the exclusive-invite mode 2103-2) can be presented in a manner that is distinct from a multi-invite invitation (e.g., an invitation 141 for a request 173 that is being fulfilled in accordance with the multi-invite mode 2103-3). And the manner in which content is presented can refer to the appearance of the content as well as the triggering of the presentation of the content (e.g., whether the content is automatically triggered to be presented without any provider actions or whether a provider action such as a selection or input triggers the presentation of the content).

According to embodiments, the network system 100 is further configured to determine a mode of invite presentation for multi-invite modes. A multi-invite invitation 141 can be presented on the recipient provider device 180 in accordance with (i) an active multi-invite presentation mode (2103-3A) or (ii) a passive multi-invite presentation mode (2103-3B). In one aspect, in response to receiving an invitation 141 determined to be presented in accordance with the active multi-invite presentation mode, the recipient provider device 180 can automatically trigger the presentation of content relating to the invitation 141, such as information relating to the start and destination location of the request 173. On the other hand, in response to receiving an invitation 141 determined to be presented in accordance with the passive multi-invite presentation mode, the recipient provider device can provide an indication (e.g., indicator 4103 of FIG. 4A) within the service provider application 182 that one or more invitations 141 or offers are pending for the service provider 181 without automatically presenting detailed information regarding the invitation 141. Detailed information relating to the invitation 141 can be presented in response to the service provider 181 interacting with the service provider application 182 (e.g., interaction with the indicator 4103 shown in FIG. 4A). In the manner described herein, invitations 141 can be presented by the provider devices 180 in accordance with the determined mode of operation and/or the determined mode of invitation presentation.

Figure 2B:
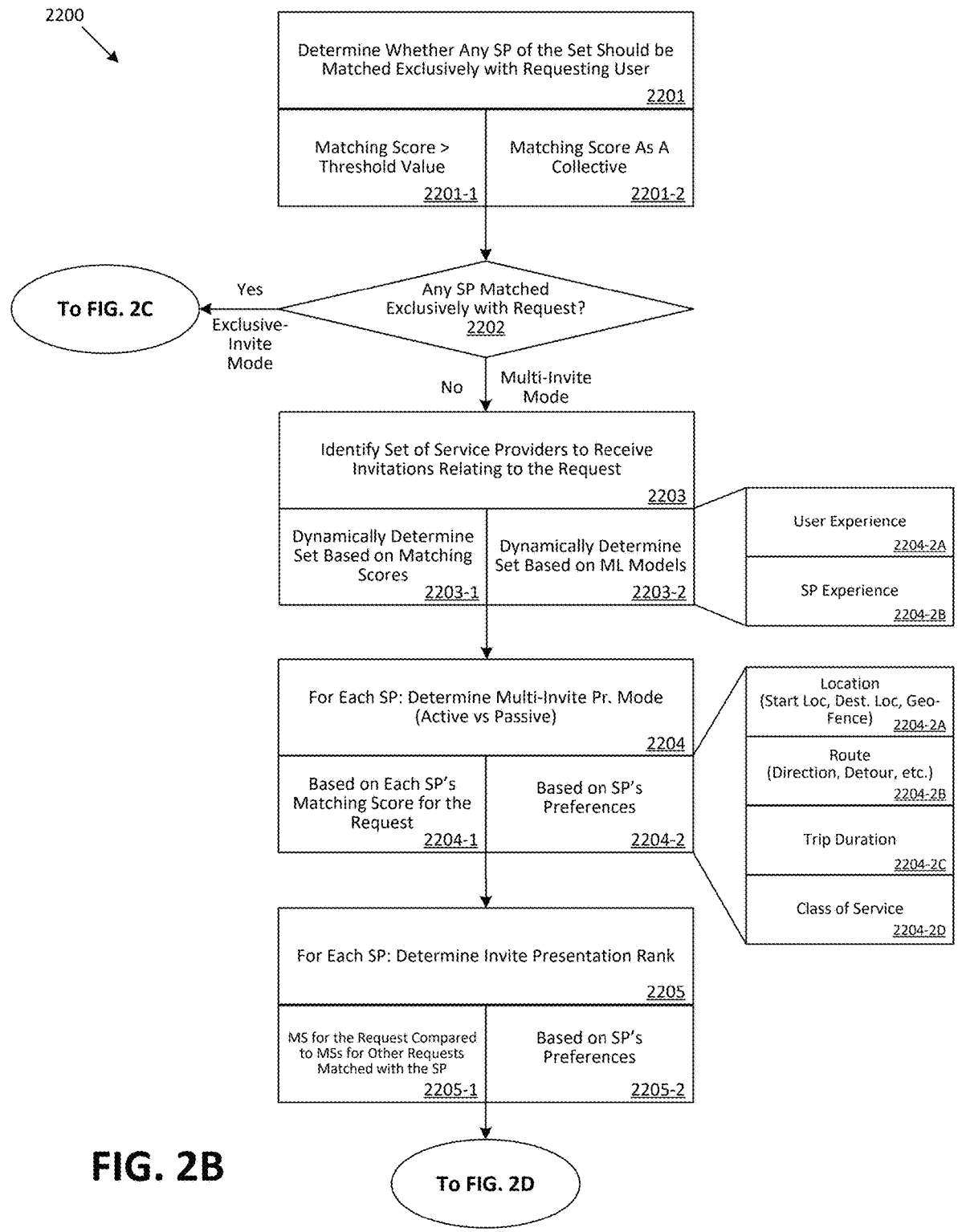
FIG. 2B is a flowchart diagram illustrating an example method of determining a match mode and/or an invitation presentation mode, in accordance with examples described herein.
Figure 2C:
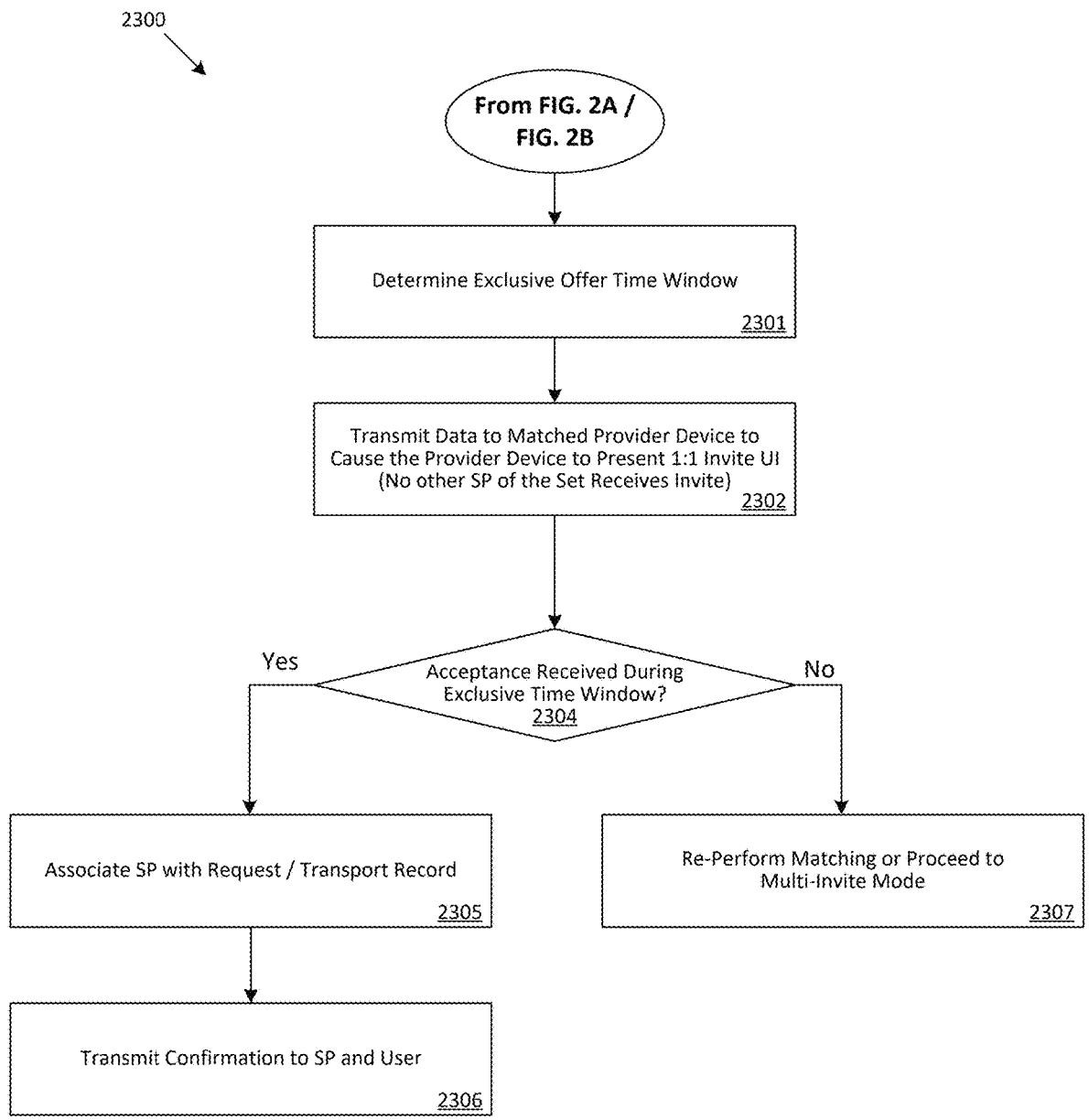
FIG. 2C is a flowchart diagram illustrating an example method of processing a request in accordance with an exclusive-invite or one-to-one match mode, in accordance with examples described herein.
Figure 2D:
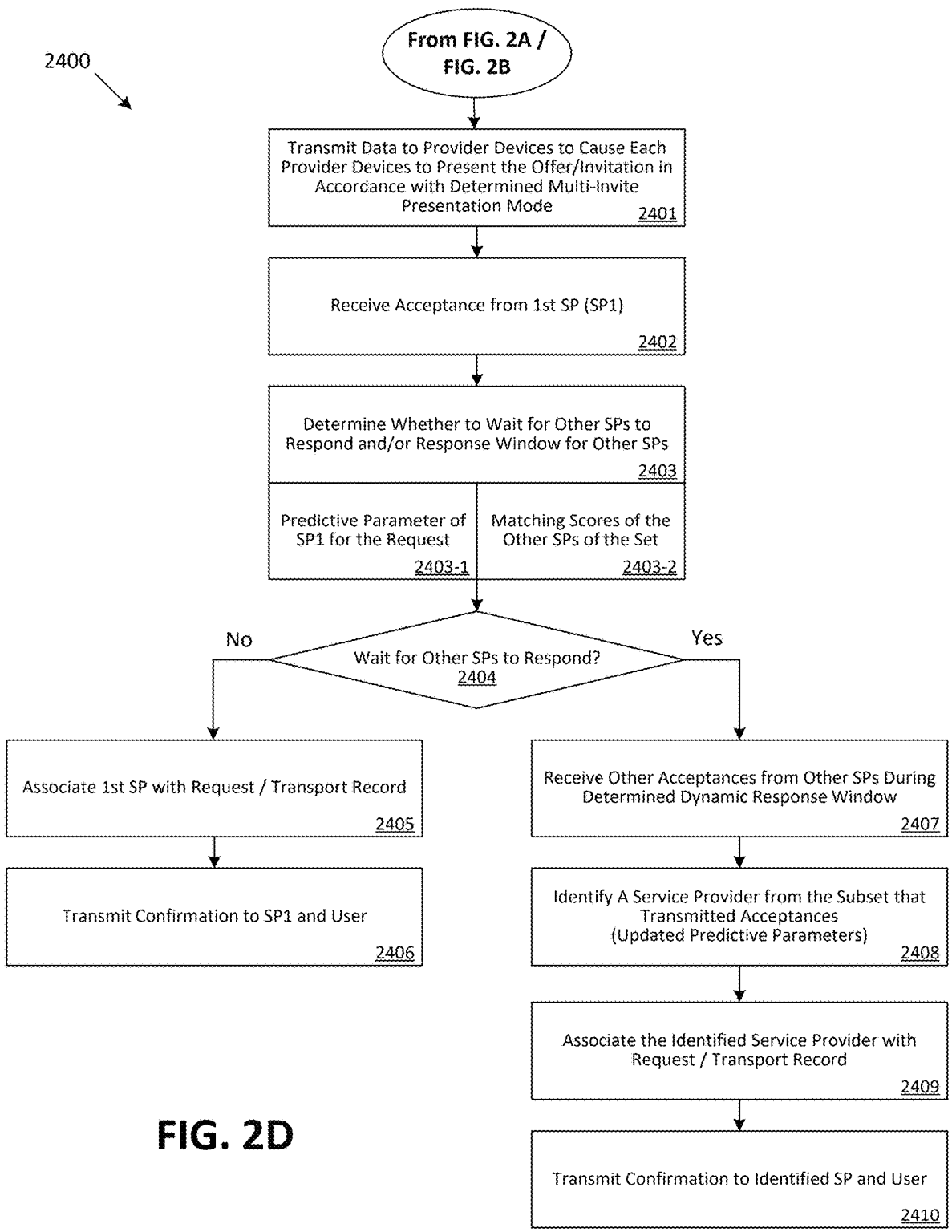
FIG. 2D is a flowchart diagram illustrating an example method of processing a request in accordance with a multi-invite mode, in accordance with examples described herein.

At step 2104, the network system can determine to proceed based on the determination of whether to fulfill the request in accordance with the exclusive in-invite mode (as shown in FIG. 2C) or in accordance with the multi-invite mode (as shown in FIG. 2D).

FIG. 2B is a flowchart diagram illustrating an example method 2200 of determining a match mode and/or an invitation presentation mode, in accordance with examples described herein. In the below discussions of FIG. 2B, reference may be made to FIG. 1 and FIG. 2A. For instance, the method 2200 illustrated in FIG. 2B may be performed by the network system 100 of FIG. 1. Furthermore, the method 2200 can be an exemplary implementation of step 2103 (and its sub-components or sub-steps) that is illustrated in and described with respect to FIG. 2A.

Referring to FIG. 2B, at step 2201, the network system can determine whether any of the service providers 181 available to be matched with a received request 173 should be matched exclusively with the request 173. Prior to step 2201, the network system 100 computes initial predictive parameters 131 of service providers 181 that are available to be matched with the request 173 (e.g., at step 2102 of FIG. 2A). And the determination at step 2201 can be based on the initial predictive parameters 131 determined for the available service providers 181. The determination can be made based on whether any of the initial predictive parameters 131 exceeds a threshold value (2201-1). For instance, if two or more service providers' initial predictive parameters 131 exceeds a threshold value (e.g., indicating that the two or more service providers 181 are particularly suitable matches for fulfilling the received request 173), the network system 100 can determine at step 2202 to proceed in accordance with the exclusive-invite mode. Moreover, the service provider 181 having the most desirable initial predictive parameter 131 can be exclusively matched with the request 173. The threshold value for predictive parameters 131 can be predetermined based on historical data. For instance, back testing can be performed to tune the threshold value to derive the optimal behavior of the system in determining whether or not requests should be fulfilled in accordance with the exclusive-invite mode or in accordance with the multi-invite mode. Furthermore, different threshold values can be precomputed for different times (e.g., days of the week, times of the day, weekday vs weekend, etc.), specific locations (e.g., the geographic region or subregion in which the start or service location is located, whether the start location is an airport location, etc.), and other conditions (e.g., weather conditions, whether large attendance events are being held nearby, etc.).

In addition or as an alternative, the determination at step 2201 can be made based on the predictive parameters 131 of the available service providers 181 as a collective (2201-2). This can indicate, for example, if one service provider 181 among the available service providers 181 is much better suited in comparison with the others of the available service providers 181 in fulfilling the request 173. For instance, the network system 100 can determine whether any service provider's initial predictive parameter 131 satisfies one or more statistical criteria (e.g., being a percentage higher or a certain standard deviation higher) in relation to the initial predictive parameters 131 of the other service providers 181. In response, the network system 100 can proceed in accordance with the exclusive-invite mode and can identify, exclusively for the request, the service provider 181 satisfying the one or more criteria.

At step 2202, if it is determined that a given service provider 181 is to be matched with the request exclusively, the network system 100 can proceed in accordance with the exclusive-invite mode (e.g., as illustrated in FIG. 2C).

On the other hand, if the network system 100 determines that no service provider 181 is to be matched with the request 173 exclusively, the network system 100 can proceed in accordance with the multi-invite mode. In the multi-invite mode, the network system 100 can further identify, at step 2203, a set of service providers 181 from the plurality of available service providers 181 to receive multi-invite invitations 141 relating to the request 173 being processed in the method 2200. The set of service providers 181 can be identified based on their initial predictive parameters 131. For instance, the set of service providers 181 having the highest predictive parameters 131 among the plurality of available service providers 181 can be identified to receive multi-invite invitations 141 relating to the request 173. In some implementations, the size of the set or the number of service providers 181 to receive invitations 141 can be fixed (e.g., ten service providers 181).

As provided herein, the size and selection of service providers 181 to whom invitations 141 relating to the request 173 are transmitted can be an important consideration. For instance, the size of the set of service providers 181 being too small (e.g., too few service providers 181 being identified in the set of service providers 181) can denigrate the requesting user experience (e.g., can lead to longer wait times, the request not being fulfilled, etc.) while the size of the set of service providers 181 being too large can adversely affect the service provider experience (e.g., leading to instances of service providers 181 accepting the invitation 141 but not being selected to service the resulting transport trip). The performance of the network system 100 can also be adversely affected. For example, if too few service providers 181 are identified and none accept the invitation 141 to fulfill the request 173, the network system 100 must re-perform matching and identify other service providers 181 during the next matching time period. This can lead to wasted computing resources and greater overhead requirement for processing power and network bandwidth, particularly during peak times for the network service. On the other hand, identifying too many service providers 181 for inclusion within the set also wastes computing resources.

Thus, according to embodiments, the set of service providers 181, including the size of the set, can be dynamically determined based on the initial predictive parameters 131 of the plurality of available service providers 181 (2203-1). In this manner, a greater number of service providers 181 can be identified to receive invitations 141 if no particularly suitable matches are identified for the request 173 (e.g., as indicated by the initial predictive parameters 131 of the plurality of available service providers 181 under consideration). Conversely, a fewer number of service providers 181 can be identified to receive invitations 141 if one or more of the plurality of service providers 181 are suitable for matching with the request 173 (e.g., as indicated by their initial predictive parameters 131). Moreover, as discussed herein, one of the factors reflected by the predictive parameter 131 computed for a service provider 181 can be a predictive confidence score that the service provider 181 will accept an invitation to fulfill a request 173. Thus, one aspect of dynamically varying the size of the set of service providers 181 who receive the invitations 141 based on the predictive parameters 131 can be varying the size of the set of service providers 181 based, at least in part, on predictive metrics computed for the service providers 181 (e.g., the predictive parameter 131 or components thereof) that are indicative of the respective likelihoods that the service providers 181 will accept invitations 141 relating to the request 173. In this manner, the network system 100 can transmit invitations 141 relating to the request 141 to an optimal number of service providers 181 that is specifically and dynamically determined for the request 173 and given the conditions of the service providers 181 available for matching.

In addition or as an alternative, the size of the set of service providers 181 can be dynamically determined based on outputs of one or more machine-learned models (MLMs) 153 (2203-2). The MLMs 153 can model the requesting user experience 2204-2A and can model the service provider experience 2204-2B. For instance, an MLM 153 that is predictive of the request 173 to completed trip ratio can be used to model the requesting user experience and an MLM 153 that is predictive of the service provider acceptance to assignment to trip ratio can be used to model the service provider experience. By taking into account both the requesting user experience and the service provider experience, the network system 100 can identify an optimal number of service providers 181 for inclusion in the set of service providers 181 to receive invitations 141 relating to the request 173.

At step 2204, the network system 100 can determine to implement, for each service provider 181 of the set of service providers 181, a respective multi-invite presentation mode. As discussed herein, a multi-invite invitation 141 can be presented either in the active multi-invite presentation mode or in the passive multi-invite presentation mode. In the active multi-invite presentation mode, a recipient provider device 180 can be triggered to automatically (e.g., without input or interaction from the service provider 181) present the content corresponding to the invitation 141 and the request 173 (e.g., information relating to the start location and/or the destination location, ETA to the start location and/or the destination location, estimated duration of the trip, an estimated fare, a service class, etc.) in response to receiving the invitation 141 from the network system 100. In contrast, in the passive multi-invite presentation mode, the recipient provider device 180 can update a GUI feature that provides an indication of the received invitation 141 without triggering the presentation of detailed information corresponding to the invitation 141 or the request 173. In the passive multi-invitation presentation mode, the provider device 180 can present the detailed information relating to the invitation 141 and/or request 173 in response to a service provider input or interaction (e.g., with the GUI feature that provides the indication of the received invitation 141).

The multi-invite presentation mode can be determined for each service provider 181 based on the respective predictive parameter 131 of each service provider 181 with respect to the request 173 (2204-1). For instance, a first service provider 181 of the set of service providers 181 having a higher predictive parameter 131 with respect to the request 173 can receive a first invitation 141 relating to the request 173 and present the first invitation 141 in the active multi-invite presentation mode. In contrast, a second service provider 181 of the set of service providers 181 having a lower predictive parameter 131 with respect to the request 173 can receive a second invitation 141 relating to the request 173 and present the second invitation 141 in the passive multi-invite presentation mode. In this manner, the presentation of an invitation 141 can be dynamically customized based on the suitability of the recipient service provider 181 with respect to the invitation 141.

In addition, the multi-invite presentation mode can further be determined based on the service provider's preferences with respect to the matching process 2204-2. For instance, a multi-invite invitation 141 that would result in an aspect of the network service (e.g., a transport or delivery trip) not satisfying the indicated preferences of the service provider 181 can be presented in accordance with the passive multi-invite presentation mode. A service provider 181 can provide such preferences by interacting with the service provider application 182 executing on the provider device 180 of the service provider 181. The preferences can include one or more of: (i) a location preference (2204-2A) (e.g., indicating a preference for start and/or destination locations, or a defined geofence for provision of transport or delivery services), (ii) a route preference (2204-2B) (e.g., a direction of travel of the transport trip, a detour (e.g., in terms of ETA or distance traveled) from a defined route of travel if the service provider 181 fulfills the request 173, etc.), (iii) a trip duration (2204-2D) (e.g., in terms of ETA or distance traveled), and/or (iv) a desired class of service in providing the transport service (2204-2D). Any other service provider preferences relating to the network service can be configured and stored in a service provider profile 152 of the service provider 181.

At step 2205, a relative ranking of the invitation 141 can be determined. As each service provider 181 of the set of service providers 181 can receive multiple multi-invite invitations 141, for a given service provider 181, the network system 100 can determine a relative ranking in presenting the invitation 141 with respect to other invitations 141 pending for the given service provider 181. An invitation 141 having a higher ranking can be presented more prominently or higher in ranking within a list of invitations 141 (e.g., within the passive multi-invite presentation mode). The determination can be based on the predictive parameter 131 of the invitation 141 as compared with the predictive parameters 131 of other invitations 141 that are pending for the service provider 181 (2205-1). The determination can also be based on the service provider's preferences (2205-2), similar to those described with respect to 2204-2. As illustrated in FIG. 2B, the network system 100 can determine the relative rank of each invitation 141 for a specific service provider 181 and the provider device 180 of the service provider 181 can present the invitations 141 in accordance with the determined ranking. In other implementations, the relative rank of the invitation 141 can be determined by the provider device 180 in response to receiving the invitation 141.

FIG. 2C is a flowchart diagram illustrating an example method 2300 of processing a request 173 in accordance with the exclusive-invite or one-to-one match mode, in accordance with examples described herein. Referring to FIGS. 2A and 2B, for example, the method 2300 can be performed in conjunction with methods 2100 and 2200 to fulfill a request 173 in the exclusive-invite mode. More specifically, the method 2300 can be performed following step 2104 of FIG. 2A and/or step 2202 of FIG. 2B.

Prior to step 2301, the network system 100 identifies a service provider 181 that is to be exclusively matched with the request 173 (e.g., step 2103 of FIG. 2A and/or step 2201 of FIG. 2B). At step 2301, the network system 100 can determine an exclusive offer time window for the matched service provider 181. The exclusive offer time window can refer to the period of time during which the request 173 is matched exclusively with a given service provider 181. During this time, no other service providers 181 will receive an invitation 141 relating to the request 173. If the service provider 181 accepts the invitation 141 during the exclusive offer time window, the network system 100 can proceed to associate the service provider 181 with the request 173 (e.g., steps 2305 and 2306). If the service provider 181 does not respond or accept the invitation 141 during the exclusive offer time window, the network system 100 can re-perform matching or proceed to the multi-invite mode (e.g., step 2307). The exclusive offer time window can be determined based on the predictive parameter 131 of the service provider 181. In this manner, a service provider 181 having a predictive parameter 131 that is indicative of the service provider 181 being a particularly suitable match for the request 173 can have a longer time period to respond to the invitation 141.

At step 2302, the network system 100 can transmit data (e.g., an exclusive invitation 141) to the provider device 180 of the matched service provider 181 to cause the provider device 180 to present information relating to the invitation 141 and/or request 173 within the provider application 182 executing on the provider device 180. For instance, the provider device 180 can present a GUI interface similar to the exclusive offer card GUI 4200 illustrated in and described with respect to FIG. 4B. The GUI interface for displaying information relating to the exclusive invite 141 can be triggered to be presented within the service provider application 182 without requiring provider input or interaction. No other service provider 181 will be presented with information relating to the request 173 while the request 173 is matched exclusively with the matched service provider 181. The service provider 181 can interact with the GUI interface to accept or decline the invitation 141.

At step 2304, if the network system 100 receives an acceptance 183 from the service provider 181 within the exclusive time window, the network system 100 can, at step 2305, associate the service provider 181 with the request 173 and/or a transport record. Furthermore, at step 2306, the network system 100 can transmit a confirmation 142 to the service provider 181 to, for example, cause the provider device 180 to present navigation directions to the start location. If an acceptance 183 is not received during the exclusive time window, or if the matched service provider 180 declines the invitation 141, the network system 100 can re-perform matching (e.g., step 2102 of FIG. 2A, including computing updated predictive parameters 131 for available service providers 181) or continue in accordance with the multi-invite mode by, for example, transmitting invitations 141 relating to the request 173 to other service providers 181.

FIG. 2D is a flowchart diagram illustrating an example method 2400 of processing a request 173 in accordance with the multi-invite mode, in accordance with examples described herein. Referring to FIGS. 2A and 2B, for example, the method 2400 can be performed in conjunction with methods 2100 and 2200 to fulfill a request in the multi-invite mode. More specifically, the method 2400 can be performed following step 2104 of FIG. 2A and/or step 2205 of FIG. 2B.

At step 2401, the network system 100 can transmit data (e.g., invitations 141) to provider devices 180 of the service providers 181 matched with the request 173 to cause each of the provider devices 180 to present the invitation 141 in accordance with the respective multi-invite presentation mode determined by the network system 100. For instance, the provider device 180 can present a GUI interfaces similar to the multi-invite presentation GUIs 4300 and 4400 illustrated in and described with respect to FIG. 4C and FIG. 4D. According to embodiments, the GUI interface for displaying information relating to a multi-invite invitation 141 can display information regarding a number of service providers 181 for whom the invitation 141 is pending (e.g., the number of service providers 181 identified from the set of service providers 181).

At step 2402, the network system 100 receives a first acceptance message 183 from a first provider device 180 of a first service provider 181 of the set of service providers 181. The first acceptance message 183 can be transmitted by the first provider device 180 in response to the first service provider 181 interacting with the service provider application 182 executing on the first provider device 180.

In some implementations, the network system 100 associates the first service provider 181 (e.g., the service provider 181 that transmitted an acceptance 183 first among the set of service providers 181) with the request 173 in response to receiving the first acceptance 183 from the first service provider 181. In other implementations, for example as illustrated in FIG. 2D at step 2403, the network system 100 can determine whether to wait for responses from other service providers 181 or to associate the first service provider 181 with the request 173 in response to receiving the first acceptance message 183. This determination can be made based on the predictive parameter 131 of the first service provider 181 (2403-1). As an example, if the predictive parameter 131 of the first service provider 181 exceeds a threshold value (e.g., indicating that the first service provider 181 is a suitable match for the request 173), the network system 100 can associate the first service provider 181 with the request 173 without waiting for additional responses from the set of service providers 181. On the other hand, if the predictive parameter 131 of the first service provider 181 is below the threshold value, the network system 100 can determine to wait for a period of time (e.g., the response time window) for the others of the set of service providers 181 to accept their respective invitations 141. The determination can also be made based on how the first service provider's predictive parameter 131 compares with the predictive parameters 131 of the set of service providers 181 (2403-2). For example, the first service provider's predictive parameter 131 can be compared to a statistical measure (e.g., an average, a median, etc.) computed for the predictive parameters 131 of the set of service providers 181. And depending on how the first service provider's predictive parameter 131 compares with the statistical measure, the network system 100 can determine whether to wait for a period of time for the other service providers 181 to accept 183 their respective invitations 141 or to associate the first service provider 181 with the request 173.

Depending on the implementation, at step 2403, the network system 100 can further determine the length of the response time window. Similar to the determination of whether to wait for a period of time for acceptances 183 of other service providers 181, the determination of the length of the response time window can be based on the predictive parameter 131 of the first service provider 181 (2403-1) (e.g., whether the first service provider's predictive parameter 131 is above or below a threshold) or can be based on the predictive parameters 131 of other service providers 181 of the set (e.g., how the first service provider's predictive parameter 131 compares with the predictive parameters 131 of the set of service providers 181). As an example, the network system 100 determines that the first service provider 181 is more suitable than the average service provider 181 of the set (e.g., the first service provider's predictive parameter 131 being more desirable than the average predictive parameter 131 of the set of service providers 181), the response time window can be made shorter.

At step 2404, if the determination at step 2403 is made to not wait for responses from other service providers 181, the network system 100 can associate the first service provider 181 with the request 173 (step 2405) and transmit confirmation messages 142 to the provider device 180 of the first service provider 181 and the requesting user 171 (step 2406). On the other hand, if the network system 100 determines to wait for a period of time for other service providers 181 to accept invitations 141, the network system 100 can receive additional acceptances 183 during the response time window (step 2407).

At step 2408, the network system 100 can identify a service provider 181 from the subset of service providers 181 that accepted their respective invitations 141 relating to the request 173. This step can use the same underlying logic and computational processes as step 2203. For instance, a service provider 181 can be identified based on the predictive parameters 131 of the subset of service providers 181, one or more machine-learned models 153, and/or ETA information.

In various implementations, the network system 100 can continuously or periodically update the predictive parameters 131 of the set of service providers 181. For instance, the network system 100 can update the predictive parameters 131 of the set of service providers 181 every ten seconds based on updated location data transmitted by the provider devices 180 of the set of service providers 181. And as can be appreciated, the determinations made that are based on the predictive parameters 131 of the service providers 181 (e.g., step 2403 and step 2408) can be made based on the updated predictive parameters 131 of the set of service providers 181 that are computed based on the updated location data and/or status information of the set of service providers 181. At step 2409, the identified service provider 181 is associated with the request 173 and/or transport record and a confirmation message 142 is transmitted to the identified service provider 181 and the requesting user 171 (step 2410).

Batch Matching Example

Figure 3:
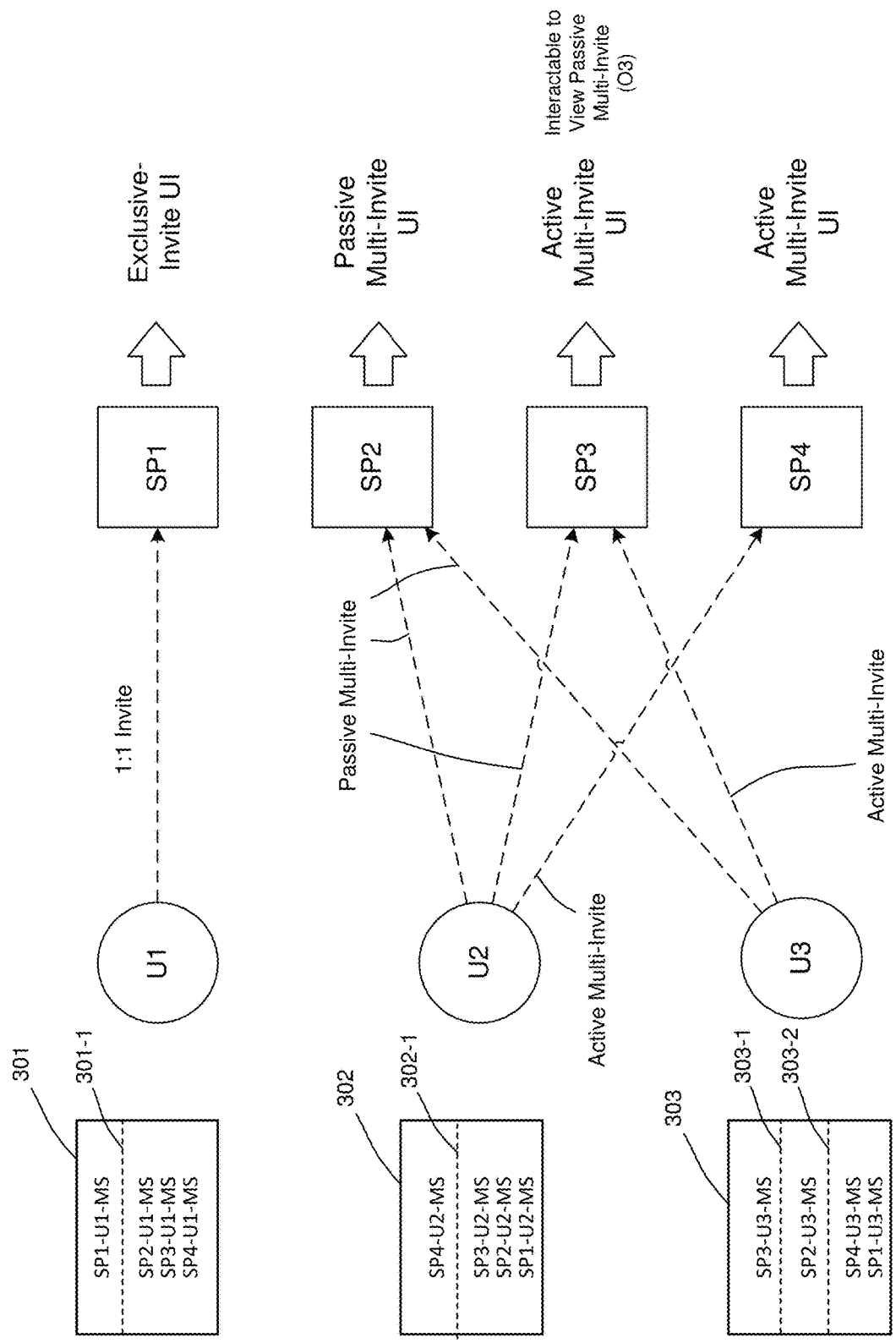
FIG. 3 is a graphical illustration of a batch matching process of multiple requests for service with multiple service providers, in accordance with examples described herein.

FIG. 3 is a graphical illustration of a batch matching process of multiple requests for service with multiple service providers, in accordance with examples described herein.

FIG. 3 illustrates three requesting users (U1, U2, and U3) and four service providers (SP1, SP2, SP3, and SP4) available for matching with the three requesting users. Each of the requesting users transmits a request during a window of time and the requests are processed by the network system 100 in a batch matching process. To perform batch matching, the network system 100 computes the predictive parameters of each service provider with respect to each request. For U1, the network system 100 computes predictive parameters 301 illustrated in a ranked list format. For instance, SP1-U1-MS signifies the predictive parameter of SP1 for the request transmitted by U1, and so on. For U2 and U3, the network system 100 computes predictive parameters 302 and 303, respectively, also illustrated in a ranked list format.

As is illustrated in FIG. 3, for U1, within the ranking scores 301, the SP1 has the highest match score with respect to the request of U1. SP1-U1-MS is above the threshold 301-1 for proceeding in accordance with the exclusive invite mode. Accordingly, SP1 is identified by the network system 100 as an exclusive match for U1. The resulting invitation for SP1 to fulfill the request of U1 is transmitted as an exclusive invite or a 1:1 offer. And the provider device of SP1 is configured to present an exclusive-invite GUI in response to receiving the invitation.

For U2, within the ranking scores 302, no service provider is identified as an exclusive match. Accordingly, the network system 100 fulfills the request of U2 in accordance with the multi-invite mode. For simplicity of illustration, each of the service providers SP1 to SP4 are determined by the network system 100 to satisfy the criteria to be included within the set of service providers identified for U2 to receive a respective invitation to fulfill the request of U2 (e.g., based on their respective predictive parameters). However, because SP1 is being exclusively matched with U1, the network system 100 can remove or filter out SP1 from being included within the set of service providers who will receive invitations to fulfill the request of U2. Thus, SP2, SP3, and SP4 will each receive a multi-invite invitation to fulfill the request of U2. The network system 100 can then determine the multi-invite presentation mode for each of these service providers. As illustrated in FIG. 3, SP4 satisfies a criteria or threshold 302-1 (e.g., based on SP4's predictive parameter with respect to U2) for presenting content in accordance with the active multi-invite presentation mode. The provider devices of SP3 and SP2, on the other hand, will present content corresponding to invitations to fulfill the request of U2 based in accordance with the passive multi-invite presentation mode.

For U3, within the ranking scores 303, no service provider is identified as an exclusive match. Accordingly, the network system 100 fulfills the request of U3 also in accordance with the multi-invite mode. Furthermore, SP4 and SP1's predictive parameters fall below a criteria or threshold value 303-2 for inclusion in the set of service providers to receive invitations to fulfill the request of SP4. Accordingly, of the available service providers, only SP2 and SP3 will receive invitations relating to the request of U3. Moreover, the provider device of SP3 will present the resulting invitation in accordance with the active multi-invite presentation mode whereas the provider device of SP2 will present the resulting invitation in accordance with the passive multi-invite presentation mode. This is because the predictive parameter of SP3 satisfies a criteria or threshold value 303-1 for the active multi-invitation presentation mode.

The provider device of SP1 receives only one invitation during this batch matching process and presents the exclusive-invitation GUI in response to receiving the invitation to fulfill the request of U1. The provider device of SP2 receives two multi-invite invitations, both to be presented in the passive multi-invite presentation mode. The provider device of SP3 receives two multi-invite invitations: one to be presented in the active multi-invite presentation mode (for U3) and one to be presented in the passive multi-invite presentation mode. Thus, the provider device of SP3 can be triggered to automatically present information relating to the request of U3 (e.g., in accordance with the active multi-invite presentation mode). The provider device of SP3 can be caused to present information relating to the request of U2 in response to a user input within the active multi-invite GUI or elsewhere within the service provider application (e.g., in accordance with the passive multi-invite presentation mode). The provider device of SP4 receives the invitation to fulfill the request of U2 and presents information thereof in accordance with the active multi-invite presentation mode.

Graphical User Interface

FIGS. 4A to 4D illustrate example graphical user interfaces presented by the service provider application 182, in accordance with examples described herein. In the below discussion of FIGS. 4A to 4D, reference may be made to features and examples shown and described with respect to FIGS. 1 through 3. For instance, the example graphical user interfaces illustrated in FIG. 4A can be presented by the provider device 180 of FIG. 1.

Figure 4D:
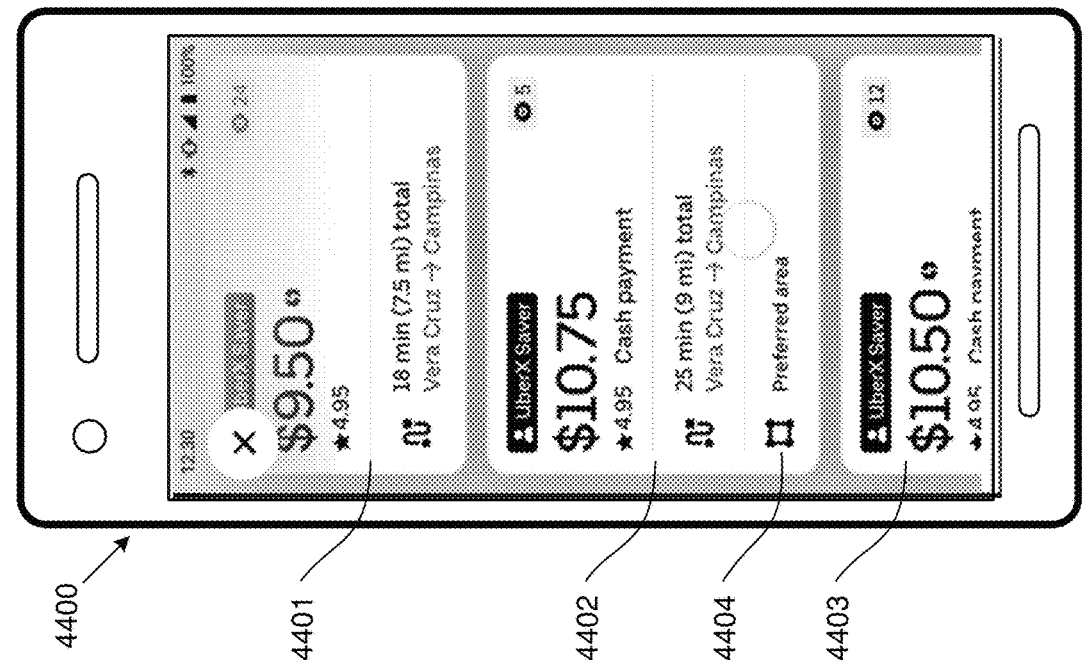

Referring to FIG. 4A, the graphical user interface (GUI) 4100 illustrated in FIG. 4A can be presented by the provider device 180 while the service provider 181 waits for matches with requests for service 173 submitted by requesting users 171. The GUI 4100 can be presented in response to the service provider 181 interacting with the service provider application 182 to enter into an active service provider status (e.g., representing the service provider being available to receive invitations 141 to fulfill requests for service 173). The GUI 4100 can include a map feature 4101 that includes an indication of the service provider's current location 4102. The graphical user interface 4100 can further include a GUI feature 4103 (annotated within the graphical user interface 4100 as "Offers Available") that is interactable by the service provider 181 to trigger provider device 180 to present another GUI illustrating pending passive multi-invite offers available to the service provider 181 (e.g., such as GUI 4400 illustrated in FIG. 4D). For instance, the service provider 181 can tap or select the GUI feature 4103 to enter the GUI 4400 illustrated in FIG. 4D. The "Offers Available" GUI feature 4103 can further include a GUI feature 4104 that displays a number of pending passive multi-invite offers that are available to the service provider 181 for acceptance. The GUI feature 4104 can be dynamically and continuously updated in response to data received from the network system 100 such as invitation data corresponding to new passive multi-invite offers for the service provider 181 and/or data indicating that a passive multi-invite offer for the service provider 181 has expired or been accepted by or assigned to another service provider 181. The GUI 4100 further includes a status bar feature 4105 that displays an indication of the current status of the service provider 181. In the example illustrated in FIG. 4A, the status bar feature 4105 provides an indication to the service provider 181 that the network system 100 is currently matching requests for service 173 with the service provider 181. The status bar feature 4105 can be interacted with (e.g., via a tap gesture or a slide up gesture) to reveal additional relevant information to the service provider 181 and to enable the service provider 181 to modify settings that can affect the matching of service provider 181 with requests for service 173 and/or settings that can affect the display of invitations 141. Such settings can include, for example, (i) a setting relating to the auto acceptance 183 of incoming invitations 141, (ii) a setting relating to a geography preference (e.g., start location, service location, or a geofence or geographic region for the start location and/or the service location etc.), (iii) a setting relating to a route preference (e.g., a route direction, an maximum amount of detour from a planned route, etc.), and/or (iv) a setting relating to a desired trip duration or travel time.

FIG. 4B illustrates an exclusive offer card GUI 4200 for presenting an exclusive invitation 141 within the service provider application 182. The exclusive offer card GUI 4200 can be presented automatically (e.g., without any user input or interactions with the service provider application) in response to the provider device 180 of the service provider 181 receiving an exclusive invitation 141 from the network system 100. For instance, the service provider application 182 can automatically transition from presenting the GUI 4100 illustrated in FIG. 4A to the exclusive offer card GUI 4200 illustrated in FIG. 4B in response to receiving an exclusive invitation 141 (e.g., an invitation 141 to fulfill a request for service 173 that is being exclusively matched with the service provider 181 operating the provider device 180). In other words, other available service providers 181 do not receive invitations 141 relating to the request 173 while the exclusive invitation 141 is pending for the service provider 181. The service provider 181 can interact with the exclusive offer card GUI 4200 illustrated within FIG. 4B to accept 183 or decline the exclusive invitation 141 to fulfill the request for service 173.

In various aspects, the exclusive offer card GUI 4200 is designed to be displayed prominently within the service provider application 182. Moreover, the transition from the GUI 4100 to the exclusive offer card GUI 4200 is further designed to be automatic (e.g., without user intervention). In this manner, the presentation of the exclusive offer card GUI 4200 may capture the attention of the service provider 181. As described herein, the network system 100 can determine to match the service provider 181 exclusively with the request 173 based on parameters 131 that indicate that the service provider 181 is particularly well-suited to fulfill the request 173 (e.g., based on the predictive parameter 131 of the service provider 181 with respect to the request 173 satisfying one or more criteria such as exceeding a threshold value or meeting some statistical measure in comparison with the predictive parameters 131 of other available service providers 181 with respect to the request 173). The determination can also be based at least in part on a computed predictive confidence score indicative of the service provider's likelihood or propensity to accept the invitation 141. In this manner, the exclusive offer card GUI 4200 can be presented only for a request 173 that a given service provider 181 is determined to be highly suitable for and highly likely to accept 183 the request 173.

The GUI 4200 can include a map feature 4201 that displays a current location of the service provider 4202. The map feature 4201 can further display information that relates to the request 173 that corresponds to the exclusive invitation 141 that trigger the presentation of the GUI 4200. For instance, the map feature 4201 can display a start or rendezvous location 4203 of the request 173, a destination or drop-off location 4204 of the request 173, and a preliminary route 4205 determined for the service provider 181 to travel from the service provider's current location to the start location, and then to the destination location.

The GUI 4200 can further include an information card 4206 that includes additional information relevant to the service provider 181 in determining whether to accept 183 or decline the exclusive invitation 141. For example, an estimated fare or price can be displayed within the information card 4206 that corresponds to an estimated or computed fare that would be earned by the service provider 181 in fulfilling the request 173. The information card 4206 can further display a service class of the request for service 173 and detailed information 4208 regarding the preliminary route, including an estimated travel distances and travel times of the service provider 181 (i) from his or her current location to the start location and (ii) from the start location to the destination location. The information card 4206 can further include one or more indications 4209 regarding whether the request for service 173 satisfies one or more service provider preferences set by the service provider 181. In the example illustrated in FIG. 4B, the one or more indications 4209 indicate that the request for service 173 satisfies the service provider's preference (e.g., set via input within the service provider application 182) of a preferred geographic area. Depending on the implementation, this can indicate that one of: (i) the start location is within the preferred geographic area, (ii) the destination location is within the preferred geographic area, or (iv) the entire route is within the preferred geographic area.

According to embodiments, the GUI 4200 further includes an exclusive match indicator 4207, which is a GUI feature that provides a visual indication to the service provider 181 that the invitation 141 being displayed within the GUI 4200 is an exclusive match for the service provider 181. The exclusive match indicator 4207 can further provide a visual indication of the time period remaining for the exclusive match between the service provider 181 and the request 173. The visual indication of the time period remaining can be conveyed as a visual bar which counts down the exclusive match time period.

The GUI 4200 further includes an exit feature 4210 to return the service provider 181 to the user interface displayed prior to receiving the exclusive invitation 141 (e.g., GUI 4100 of FIG. 4A). In some implementations, the service provider 181 interacting with the exit feature 4210 can cause the exclusive match between the service provider 181 and the request 173 to be terminated ahead of the expiration of the exclusive time period. For instance, the service provider 181 interacting with the exit feature 4210 can cause the provider device 180 to transmit a set of data to the network system 100 to cause the network system 100 to immediately terminate the exclusive match between the service provider 181 and the request 173. Furthermore, the network system 100 can, in response, re-perform matching for the request 173 and/or proceed in fulfilling the request 173 in the multi-invite mode. In addition or as an alternative, in response to the service provider 181 interacting with the exit feature 4210, the provider device 180 can transmit a response to the network system 100 to indicate that service provider 181 has declined the exclusive invitation 141.

Figure 4C:
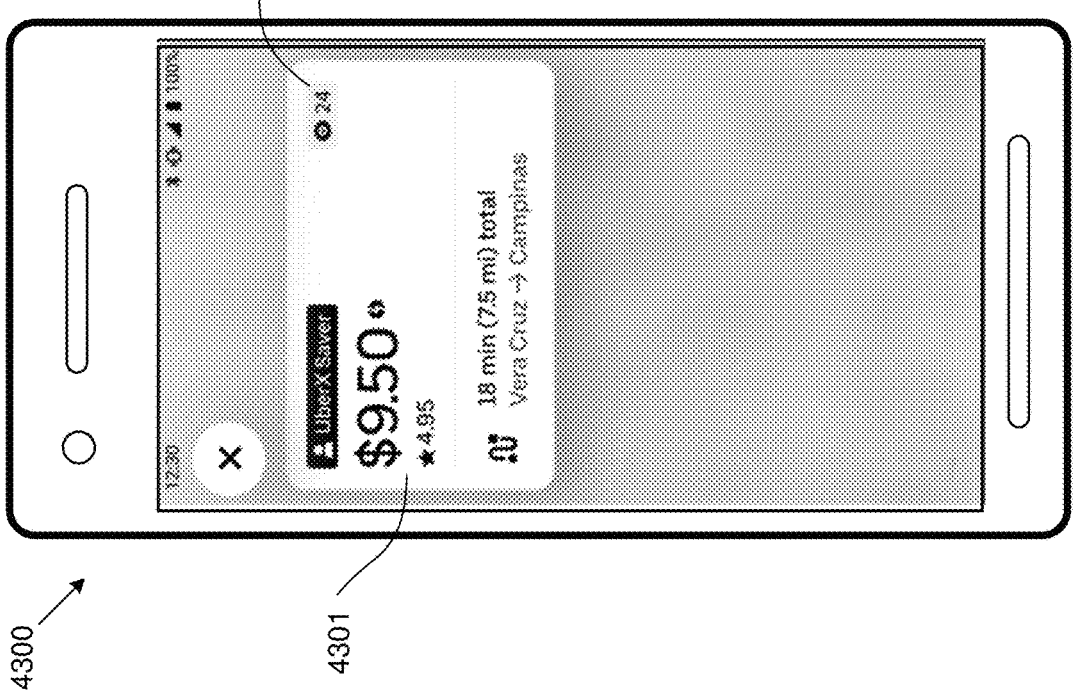

FIGS. 4C and 4D illustrate job board GUIs 4300 and 4400, respectively, for presenting multi-invite invitations within the service provider application 182. The active job board GUIs 4300 and 4400 can display information relating to active multi-invite invitations (e.g., multi-invite invitations that are determined by the network system 100 to be presented for the service provider 181 in accordance with the active multi-invite presentation mode as illustrated in, for example, FIG. 2B) and/or passive multi-invite invitations (e.g., multi-invite invitations that are determined by the network system 100 to be presented for the specific service provider 181 in accordance with the passive multi-invite presentation mode as illustrated in, for example, FIG. 2B). The job board GUIs 4300 and 4400 can be triggered to be presented by the provider device 180 in response to the provider device 180 receiving an active multi-invite invitation. In addition, the job board GUIs 4300 and 400 can also be triggered to be presented in response to user interactions with the service application 182 such as tapping or selecting a GUI feature within the service application 182 (e.g., the Offers Available GUI feature 4103 of FIG. 4A). Moreover, the job board GUIs 4300 and 4400 can be designed to be distinct and visually distinguishable from GUIs that display or present information relating to exclusive invitations 141 (e.g., the exclusive offer card GUI 4200 of FIG. 4B).

Referring to FIG. 4C, the job board GUI 4300 can display information relating to active multi-invite invitations and can be presented automatically (e.g., without any user input or interactions with the service provider application 182) in response to the provider device 180 of the service provider 181 receiving an active multi-invite invitation from the network system 100. For instance, the service provider application 182 can automatically transition from presenting the GUI 4100 illustrated in FIG. 4A to the job board GUI 4300 illustrated in FIG. 4C in response to the provider device 180 receiving an active multi-invite invitation 141. In some implementations, the active job board GUI 4300 can be limited to presenting a single active multi-invite invitation 141 (e.g., the most recently received active multi-invite invitation 141). In other implementations, the active job board GUI 4300 can present multiple active multi-invite invitations 141 simultaneously.

The job board GUI 4300 can display one or more information cards relating to the received active multi-invite invitations 141 such as information card 4301. Information card 4301 can display information relating to the received active multi-invite invitation 141 such as an estimated fare or payment to the service provider 181 for fulfilling the request 173, the requested service class, information relating to the start location and destination location of the request 173, information relating to an estimated duration of the transport job, and the like. In addition, the information card 4301 can further include an indicator 4302 that provides an indication of the number of service providers 181 for which the particular request 173 is pending. For instance, in the example illustrated in FIG. 4C, the indicator 4302 can signify that the network system 100 transmitted multi-invite invitations to twenty-four service providers 181 who are available to fulfill the request 173.

According to embodiments, information relating to passive multi-invite invitations 141 that are pending for the service provider 181 is not presented within the job board GUI 4300. To view information relating to the pending passive multi-invite invitations 141, the service provider 181 can, for example, provide a scroll touch input within the job board GUI 4300. In response to receiving such an input, the provider device 180 can present, for example, the job board GUI 4400 that presents information relating to the passive multi-invite invitations 141.

Referring to FIG. 4D, the job board GUI 4400 can present information relating to passive multi-offer invitations 141 (or information relating to both active and passive multi-offer invitations 141). To view the job board GUI 4400, the service provider 181 can interact with the GUI 4100 (e.g., by interacting with the Offers Available GUI feature 4103 of GUI 4100) or by interacting with the job board GUI 4300 (e.g., by a scroll input or a directional touch input) that displays information relating to active multi-invite invitations.

The job board GUI 4400 includes a plurality of offer cards 4401, 4402, and 4403. Each of the offer cards 4401, 4402, and 4403 corresponds to a multi-invite invitation that is pending for the service provider. The service provider can interact with any of the offer cards 4401, 4402, and 4403 to accept 183 or decline the corresponding invitations 141. Relevant offer card 4402 also indicates that the invitation 141 corresponds to a request 173 that is within a preferred area 4404 of the service provider 181.

Hardware Diagrams

Figure 5:
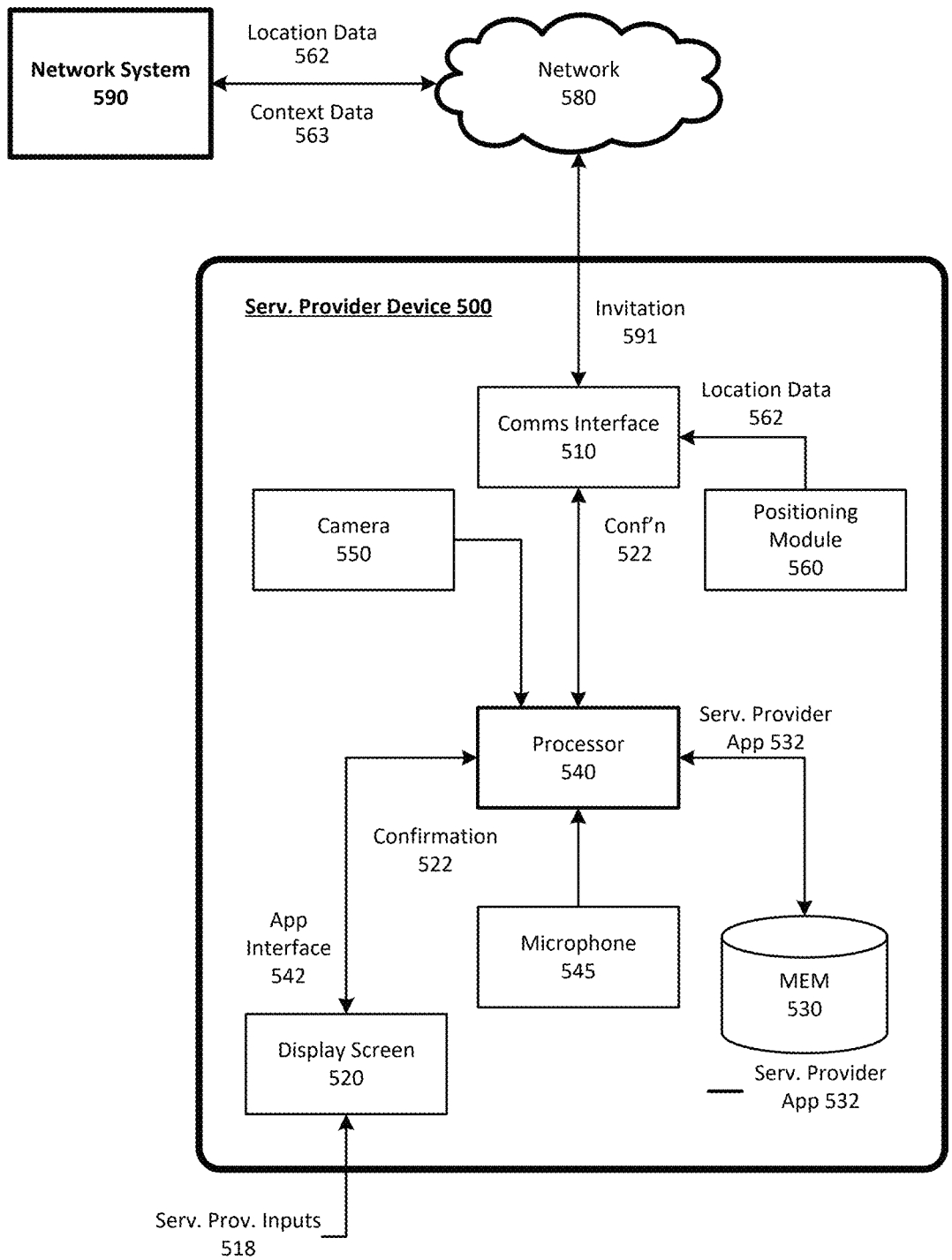
FIG. 5 is a block diagram illustrating an example service provider device executing and operating a designated service provider application for communicating with a network service, according to examples described herein.

FIG. 5 is a block diagram illustrating an example service provider device 500 executing and operating a designated service provider application 532 for communicating with a network service, according to examples described herein. In many implementations, the service provider device 500 can comprise a mobile computing device, such as a smartphone, tablet computer, laptop computer, VR or AR headset device, and the like. As such, the service provider device 500 can include typical telephony features such as a microphone 545, a camera 550, and a communication interface 510 to communicate with external entities using any number of wireless communication protocols. The service provider device 500 can store a designated application (e.g., a service provider app 532) in a local memory 530. In response to a service provider input 518, the service provider app 532 can be executed by a processor 540, which can cause an app interface 542 to be generated on a display screen 520 of the service provider device 500. The app interface 542 can enable the service provider to, for example, accept or reject invitations 591 in order to service requests throughout a given region.

In certain implementations, the service provider device 500 is configured to generate and transmit, to the network system 590 over one or more networks 580, context data 563 that can be used by the network system 590 to determine a propensity of the service provider who operates the service provider device 500 to perform an action via the service provider application 532. The context data 563 can include service provider application interaction data indicating interactions or inputs of the service provider with the service provider application 532. The context data 563 can further include sensor data such accelerometer data, gyroscope data, e-compass data, and the like. In certain implementations, the network system 590 can further utilize location data 562 as context data 563 in making certain determinations. Using the context data 563, the network system 590 can determine, using one or more context models, a propensity of the service provider to, for example, decline an invitation corresponding to a service request form a user or cancel an acceptance after the service provider has accepted the invitation.

In various examples, the service provider device 500 can include a positioning module 560 (e.g., a GPS receiver), which can provide location data 562 indicating the current location of the service provider to the network system 590 over a network 580. The network system 590 can determine whether the service provider operating service provider device 500 is a suitable match for a particular request. In this determination, the network system 590 can compute a predictive parameter for the service provider based on the location data 562 and other data, including context data 563, which can be a predictive indicator of how suitable the service provider is for fulfilling a particular service request. Furthermore, in determining whether the service provider should be matched with the particular request, the network system 590 can determine a mode of operation (e.g., exclusive-invite mode vs. multi-invite mode) and a presentation mode for presenting information relating to the invitation and/or the request (e.g., an active multi-invite presentation vs. a passive multi-invite presentation mode).

In response to the service provider being determined as a match for the particular request (e.g., either an exclusive match in the exclusive-invite mode or one of a plurality of matches in the multi-invite mode), the network system 590 transmits an invitation 591 relating to the particular request to the service provider device 500. In response to receiving the invitation 591, the service provider device 500 can present information relating to the invitation 591 and/or the particular request on the display screen 520. Receipt of the invitation 591 can also trigger an audio notification. The information relating to the invitation and/or particular request can be presented in accordance to the determined mode of operation and/or the presentation mode. In some implementations, the information can be presented in distinct manners based on (i) the invitation 591 being an exclusive-mode invitation, (ii) the mode of presentation of the invitation 591 being determined for the service provider as the active multi-invite presentation mode, and/or (iii) the mode of presentation of the invitation 591 being determined for the service provider as the passive multi-invite presentation mode. The service provider can interact with the service provider application 532 to accept or decline the invitation 591.

Figure 6:
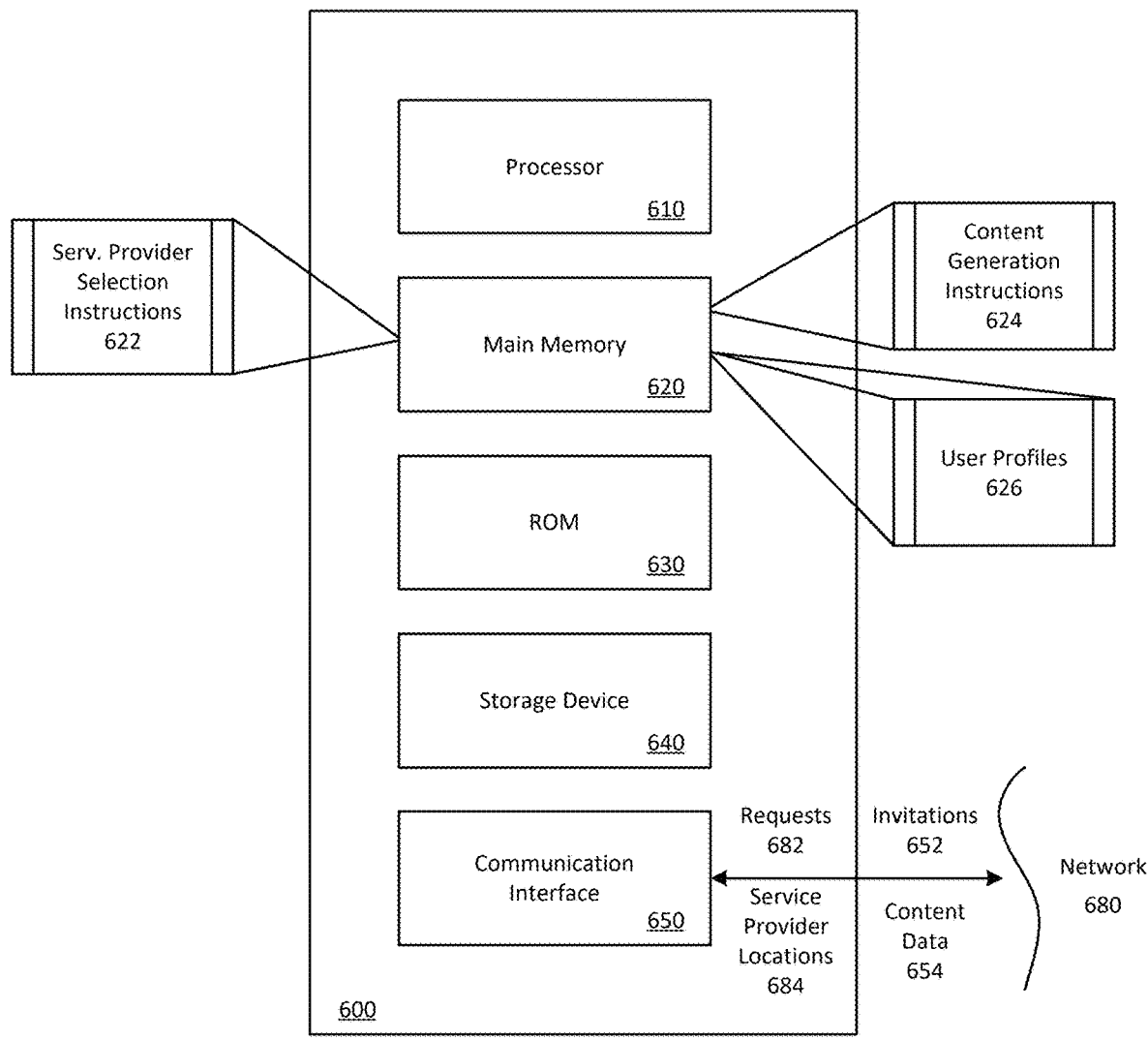
FIG. 6 is a block diagram that illustrates a computer system upon which examples described herein may be implemented.

FIG. 6 is a block diagram that illustrates a computer system upon which examples described herein may be implemented. A computer system 600 can be implemented on, for example, a server or combination of servers. For example, the computer system 600 may be implemented as part of a network service, such as described in FIGS. 1 through 5. In the context of FIG. 1, the network system 100 may be implemented using a computer system 600 such as described by FIG. 6. The network system 100 may also be implemented using a combination of multiple computer systems as described in connection with FIG. 6.

In one implementation, the computer system 600 includes processing resources 610, a main memory 620, a read-only memory (ROM) 630, a storage device 640, and a communication interface 650. The computer system 600 includes at least one processor 610 for processing information stored in the main memory 620, such as provided by a random access memory (RAM) or other dynamic storage device, for storing information and instructions which are executable by the processor 610. The main memory 620 also may be used for storing temporary variables or other intermediate information during execution of instructions to be executed by the processor 610. The computer system 600 may also include the ROM 630 or other static storage device for storing static information and instructions for the processor 610. A storage device 640, such as a magnetic disk or optical disk, is provided for storing information and instructions.

The communication interface 650 enables the computer system 600 to communicate with one or more networks 680 (e.g., cellular network) through use of the network link (wireless or wired). Using the network link, the computer system 600 can communicate with one or more computing devices, one or more servers, and/or one or more self-driving vehicles. In accordance with examples, the computer system 600 receives requests 682 from mobile computing devices of individual users. The executable instructions stored in the memory 630 can include service provider selection instructions 622, which the processor 610 executes to select a service provider to service the request 682. In doing so, the computer system can receive service provider locations 684 of service providers operating throughout the given region, and the processor can execute the service provider selection instructions 622 to identify a plurality of candidate service providers and transmit invitation messages 652 to each of the candidate service providers to enable the service providers to accept or decline the invitations. The processor can further execute the service provider selection instructions 622 to select a service provider among interested candidate service providers to service the request 682.

The executable instructions stored in the memory 620 can also include content generation instructions 624, which enable the computer system 600 to access user profiles 626 and other user information in order to select and/or generate user content 654 for display on the user devices. As described throughout, user content data 654 can be generated based on information pertaining to the state of the request (e.g., ETA/destination info). By way of example, the instructions and data stored in the memory 620 can be executed by the processor 610 to implement an example network system 100 of FIG. 1. In performing the operations, the processor 610 can receive requests 682 and service provider locations 684, and submit invitation messages 652 to facilitate the servicing of the requests 682. The processor 610 is configured with software and/or other logic to perform one or more processes, steps and other functions described with implementations, such as described by FIGS. 1 through 2D, and elsewhere in the present application.

Examples described herein are related to the use of the computer system 600 for implementing the techniques described herein. According to one example, those techniques are performed by the computer system 600 in response to the processor 610 executing one or more sequences of one or more instructions contained in the main memory 620. Such instructions may be read into the main memory 620 from another machine-readable medium, such as the storage device 640. Execution of the sequences of instructions contained in the main memory 620 causes the processor 610 to perform the process steps described herein. In alternative implementations, hard-wired circuitry may be used in place of or in combination with software instructions to implement examples described herein. Thus, the examples described are not limited to any specific combination of hardware circuitry and software.

Figure 7:
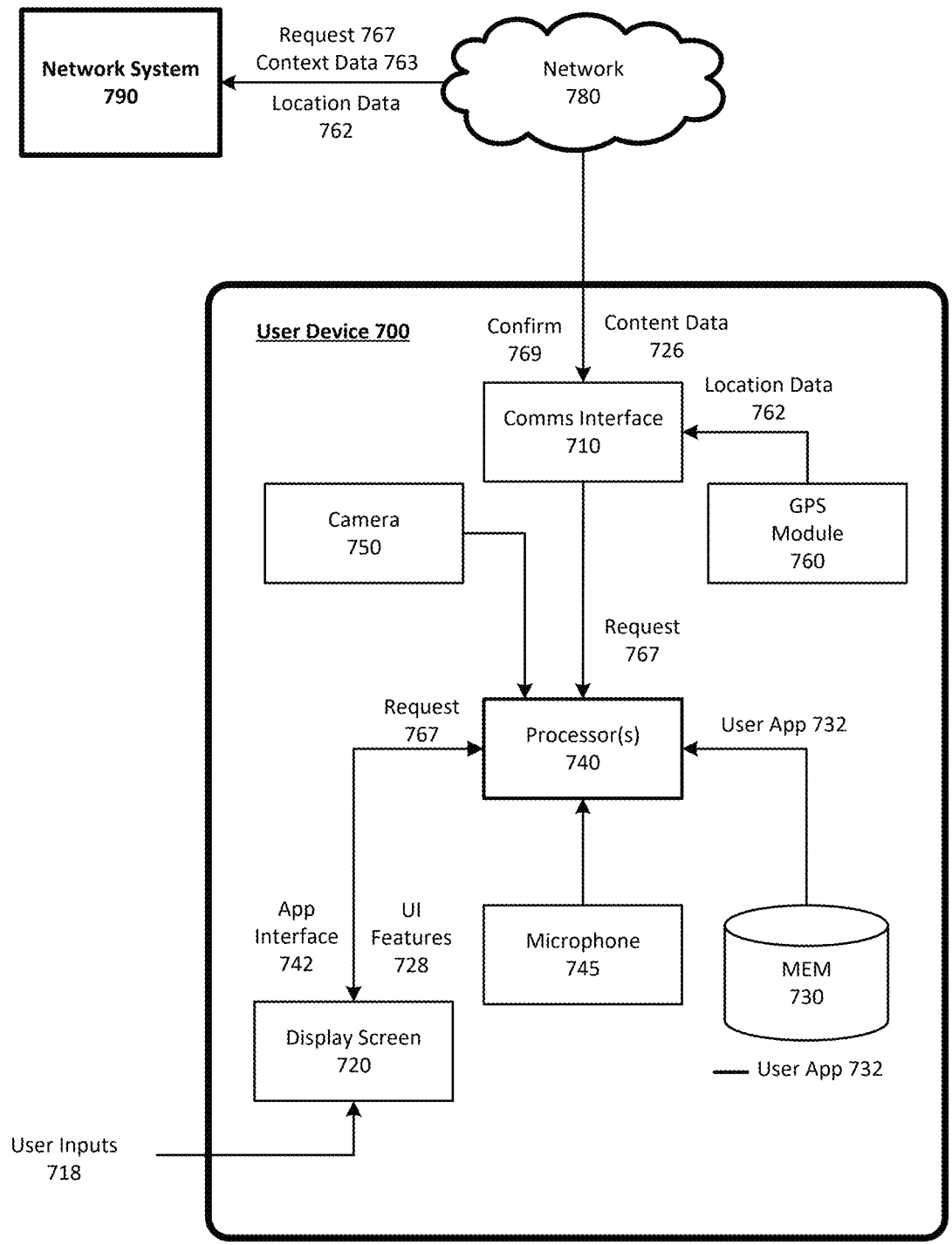
FIG. 7 is a block diagram illustrating an example user device executing and operating a designated user application for communicating with a network system, according to examples described herein.

FIG. 7 is a block diagram illustrating an example user device 700 executing and operating a designated user application 732 for communicating with a network system 790, according to examples described herein. In many implementations, the user device 700 can comprise a mobile computing device, such as a smartphone, tablet computer, laptop computer, VR or AR headset device, and the like. As such, the user device 700 can include typical telephony features such as a microphone 745, a camera 750, and a communication interface 710 to communicate with external entities using any number of wireless communication protocols. In certain aspects, the user device 700 can store a designated application (e.g., a user application 732) in a local memory 730. In variations, the memory 730 can store additional applications executable by one or more processors 740 of the user device 700, enabling access and interaction with one or more host servers over one or more networks 780.

In response to a user input 718, the user application 732 can be executed by a processor 740, which can cause an application interface 742 to be generated on a display screen 720 of the user device 700. The application interface 742 can enable the user to, for example, check current value levels and availability for the network service. In various implementations, the application interface 742 can further enable the user to select from multiple service types.

The user can generate a service request 767 via user inputs 718 provided on the application interface 742. For example, the user can select a start location, view the various service types and estimated costs, and select a particular service to an inputted destination. In many examples, the user can input the destination prior to pick-up. As provided herein, the user application 732 can further enable a communication link with a network system 790 over the network 780, such as the network system 100 as shown and described with respect to FIG. 1. The processor 740 can generate user interface features 728 (e.g., map, trip progress bar, content cards, etc.) using content data 726 received from the network system 790 over network 780. Furthermore, as discussed herein, the user application 732 can enable the network system 790 to cause the generated user interface features 728 to be displayed on the application interface 742.

The processor 740 can transmit the service requests 767 via a communications interface 710 to the backend network system 790 over a network 780. In response, the user device 700 can receive a confirmation 769 from the network system 790 indicating the selected service provider and vehicle that will fulfill the service request 767 and rendezvous with the user at the start location. In various examples, the user device 700 can further include a GPS module 760, which can provide location data 762 indicating the current location of the requesting user to the network system 790 to, for example, establish the start location and/or select an optimal service provider or autonomous vehicle to service the request 767.

In certain implementations, the user device 700 is configured to generate and transmit, to the network system 790, context data 763 that can be used by the network system to determine a propensity of the user who operates the user device 700 to perform an action via the user application 732. The context data 763 can include user application interaction data indicating interactions, inputs, selections, or a degree of progress through a particular user interface flow (e.g., a user interface flow to submit a service request). The context data 763 can further include sensor data such as barometer or elevation data, ambient light sensor data, accelerometer data, gyroscope data, location data 762, and the like. The context data 763 can further include user application status data indicating, for example, whether the user application 732 is executing as a background process or as a foreground process on the user device 700. The user application status data can further indicate a duration of time the user application 732 has been executing as a foreground process or a duration of time the user application 732 has been executing as a background process. Using the context data 763, the network system 790 can determine, using one or more context models, a propensity of the user to, for example, submit a service request within the next two minutes, or cancel a submitted service request 767 once the user is matched by the network system 790 with a service provider in response to the service request 767.

It is contemplated for examples described herein to extend to individual elements and concepts described herein, independently of other concepts, ideas or systems, as well as for examples to include combinations of elements recited anywhere in this application. Although examples are described in detail herein with reference to the accompanying drawings, it is to be understood that the concepts are not limited to those precise examples. As such, many modifications and variations will be apparent to practitioners skilled in this art. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude claiming rights to such combinations.

What is claimed is:

1. A network system for managing a network-based service, the network system comprising:
    one or more processors; and
    one or more memory resources storing instructions that, when executed by the one or more processors of the network system, cause the network system to:
        during a first time period, receive, over one or more networks, multiple requests for transport from a common geographic region, the multiple requests for transport including a first request for transport from a first user device of a first requesting user, and a second request for transport from a second user device of a second requesting user;
        during a second time period following the first time period, match each request for transport to a corresponding service provider of a plurality of service providers, wherein matching each request for transport includes:
            for the first request for transport, identifying, by accessing one or more databases, a first set of service providers from the plurality of service providers;
            for the second request for transport, identifying, by accessing the one or more databases, a second set of service providers from the plurality of service providers;
        based on a first set of predictive parameters for the first set of service providers, implement a multi-invite mode for matching the first request for transport by (i) transmitting a first invitation data set to service the first request for transport to each provider device of a plurality of provider devices of the first set of service providers, and (ii) enabling each provider of the plurality of service providers to provide acceptance data during at least a portion of the second time period; and
        based on a second set of predictive parameters for the second set of service providers, implement an exclusive-invite mode for matching the second request by (i) transmitting a second invitation data set to a provider device of a selected service provider of the second set of service providers, and (ii) enabling only the selected service provider to provide acceptance data during at least a portion of the second time period.

2. The network system of claim 1, wherein the executed instructions cause the network system to implement the multi-invite mode based on each of the first set of predictive parameters not meeting or exceeding a threshold value.

3. The network system of claim 2, wherein the first set of predictive parameters corresponds to a probability or likelihood that a particular service provider in the first set of service providers will accept the first invitation data set to service the first request.

4. The network system of claim 3, wherein the first set of predictive parameters are outputted by one or more machine-learned models using context data received from the plurality of provider devices of the first set of service providers.

5. The network system of claim 4, wherein the context data comprises at least one of (i) input data corresponding to provider interactions with a service application executing on the each provider device of the first set of service providers, (ii) location data indicating current locations of each of the first set of service providers, (iii) an estimated time of arrival of each of the first set of service providers to a service location indicated in the first request, or (iv) sensor data received from each provider device of the first set of service providers.

6. The network system of claim 1, wherein the executed instructions further cause the network system to:
receive a plurality of acceptance data from multiple provider devices of the plurality of provider devices of the first set of service providers; and
select an optimal service provider from the first set of service providers based on the plurality of acceptance data to service the first request.

7. The network system of claim 6, wherein the executed instructions cause the network system to select the optimal service provider based on the first set predictive parameters.

8. The network system of claim 1, wherein the first invitation data set is presented to at least one service provider of the first set of service providers in a job board graphical user interface that comprises a set of active multi-invite invitations.

9. The network system of claim 1, wherein the executed instructions cause the network system to implement the exclusive-invite mode for the second request based on a predictive parameter of the second set of predictive parameters meeting or exceed a threshold value.

10. The network system of claim 9, wherein the predictive parameter corresponds to a likelihood or probability that the selected service provider will accept the second invitation data set.

11. A non-transitory computer-readable medium storing instructions that, when executed by one or more processors of a network system, cause the network system to:
during a first time period, receive, over one or more networks, multiple requests for transport from a common geographic region, the multiple requests for transport including a first request for transport from a first user device of a first requesting user, and a second request for transport from a second user device of a second requesting user;
during a second time period following the first time period, match each request for transport to a corresponding service provider of a plurality of service providers, wherein matching each request for transport includes:
for the first request for transport, identifying, by accessing one or more databases, a first set of service providers from the plurality of service providers;
for the second request for transport, identifying, by accessing the one or more databases, a second set of service providers from the plurality of service providers;
based on a first set of predictive parameters for the first set of service providers, implement a multi-invite mode for matching the first request for transport by (i) transmitting a first invitation data set to service the first request for transport to each provider device of a plurality of provider devices of the first set of service providers, and (ii) enabling each provider of the plurality of service providers to provide acceptance data during at least a portion of the second time period; and
based on a second set of predictive parameters for the second set of service providers, implement an exclusive-invite mode for matching the second request by (i) transmitting a second invitation data set to a provider device of a selected service provider of the second set of service providers, and (ii) enabling only the selected service provider to provide acceptance data during at least a portion of the second time period.

12. The non-transitory computer-readable medium of claim 11, wherein the executed instructions cause the network system to implement the multi-invite mode based on each of the first set of predictive parameters not meeting or exceeding a threshold value.

13. The non-transitory computer-readable medium of claim 12, wherein the first set of predictive parameters corresponds to a probability or likelihood that a particular service provider in the first set of service providers will accept the first invitation data set to service the first request.

14. The non-transitory computer-readable medium of claim 13, wherein the first set of predictive parameters are outputted by one or more machine-learned models using context data received from the plurality of provider devices of the first set of service providers.

15. The non-transitory computer-readable medium of claim 14, wherein the context data comprises at least one of (i) input data corresponding to provider interactions with a service application executing on the each provider device of the first set of service providers, (ii) location data indicating current locations of each of the first set of service providers, (iii) an estimated time of arrival of each of the first set of service providers to a service location indicated in the first request, or (iv) sensor data received from each provider device of the first set of service providers.

16. The non-transitory computer-readable medium of claim 11, wherein the executed instructions further cause the network system to:
receive a plurality of acceptance data from multiple provider devices of the plurality of provider devices of the first set of service providers; and
select an optimal service provider based on the plurality of acceptance data to service the first request.

17. The non-transitory computer-readable medium of claim 16, wherein the executed instructions cause the network system to select the optimal service provider based on the first set predictive parameters.

18. The non-transitory computer-readable medium of claim 11, wherein the first invitation data set is presented to at least one service provider of the first set of service providers in a job board graphical user interface that comprises a set of active multi-invite invitations.

19. The non-transitory computer-readable medium of claim 11, wherein the executed instructions cause the network system to implement the exclusive-invite mode for the second request based on a predictive parameter of the second set of predictive parameters meeting or exceed a threshold value.

20. A computer-implemented method of matching requests for service, the method being implemented by one or more processors and comprising:
during a first time period, receive, over one or more networks, multiple requests for transport from a common geographic region, the multiple requests for transport including a first request for transport from a first user device of a first requesting user, and a second request for transport from a second user device of a second requesting user;

during a second time period following the first time period, match each request for transport to a corresponding service provider of a plurality of service providers, wherein matching each request for transport includes:

for the first request for transport, identifying, by accessing one or more databases, a first set of service providers from the plurality of service providers;

for the second request for transport, identifying, by accessing the one or more databases, a second set of service providers from the plurality of service providers;

based on a first set of predictive parameters for the first set of service providers, implementing a multi-invite mode for matching the first request for transport by (i) transmitting a first invitation data set to service the first request for transport to each provider device of a plurality of provider devices of the first set of service providers, and (ii) enabling each provider of the plurality of service providers to provide acceptance data during at least a portion of the second time period; and based on a second set of predictive parameters for the second set of service providers, implementing an exclusive-invite mode for matching the second request by (i) transmitting a second invitation data set to a provider device of a selected service provider of the second set of service providers, and (ii) enabling only the selected service provider to provide acceptance data during at least a portion of the second time period.

* * * * *